United States Patent [19]

Barri et al.

[11] Patent Number: 5,567,664
[45] Date of Patent: Oct. 22, 1996

[54] SUPPORTED ZEO-TYPE MEMBRANE

[75] Inventors: Sami A. I. Barri, South Ascot; Graham J. Bratton, Sidcup; Timothy D. Naylor, Egham, all of England

[73] Assignee: British Petroleum Company, p.l.c, London, Great Britain

[21] Appl. No.: 285,897

[22] Filed: Aug. 4, 1994

Related U.S. Application Data

[62] Division of Ser. No. 9,425, Jan. 27, 1993, Pat. No. 5,362,522, which is a continuation of Ser. No. 776,951, Oct. 15, 1991, abandoned.

[30] Foreign Application Priority Data

Oct. 19, 1990 [GB] United Kingdom .................. 9022836

[51] Int. Cl.⁶ .............................. B01J 20/16; B01J 35/04
[52] U.S. Cl. ............................ 502/4; 502/60; 502/64; 502/85; 210/500.25; 210/651; 210/653; 95/285; 95/902
[58] Field of Search ................................ 502/4, 60, 64, 502/85; 210/500.25, 651, 653; 95/285, 902

[56] References Cited

U.S. PATENT DOCUMENTS

| | | | |
|---|---|---|---|
| 3,244,643 | 4/1966 | Schwartz | 252/455 |
| 3,368,981 | 2/1968 | Plank et al. | 252/455 |
| 3,730,910 | 5/1973 | Albers et al. | 252/455 |
| 4,199,477 | 4/1980 | Hegedus | 252/450 |
| 4,578,372 | 3/1986 | Hoving et al. | 502/74 |
| 4,617,282 | 11/1986 | van der Vleugel | 502/66 |
| 4,673,663 | 6/1987 | Magnier | 502/320 |
| 4,699,892 | 10/1987 | Suzuki | 502/4 |
| 4,800,187 | 1/1989 | Lachman et al. | 502/64 |
| 4,904,518 | 2/1990 | Mercer et al. | 428/195 |
| 4,957,890 | 9/1990 | Wieserman et al. | 502/4 |
| 5,019,263 | 5/1991 | Haag et al. | 210/500.25 |
| 5,104,425 | 4/1992 | Rao et al. | 55/16 |
| 5,248,643 | 9/1993 | Patil et al. | 502/67 |
| 5,258,339 | 11/1993 | Ma et al. | 502/4 |
| 5,266,542 | 11/1993 | Hashimoto et al. | 502/64 |
| 5,362,522 | 11/1994 | Barri et al. | 427/435 |

FOREIGN PATENT DOCUMENTS 3827049 2/1990 Germany.

*Primary Examiner*—Shrive Beck
*Assistant Examiner*—Timothy H. Meeks
*Attorney, Agent, or Firm*—Fay, Sharpe, Beall, Fagan, Minnich & McKee

[57] ABSTRACT

Novel membranes comprise crystals of a zeo-type material carried by a porous support. The crystal growth of the zeo-type material is essentially continuous over the pores of the support and the zeo-type material is crystallized directly from and bonds directly to the support. Membranes may be prepared by immersing the support in a synthesis gel, crystallizing the gel, removing the support, and repeating these steps at least once.

19 Claims, 17 Drawing Sheets

SUPPORTED ZEO-TYPE MEMBRANE

This is a divisional of application Ser. No. 009,425 filed on Jan. 27, 1993 now U.S. Pat. No. 5,362,522, which is a continuation of application Ser. No. 776,951 filed on Oct. 15, 1991, now abandoned.

BACKGROUND OF THE INVENTION

The present invention relates to novel membranes and to a process for their production.

Zeolites and related crystalline materials are well known for their ability to accomplish separations and to act as catalysts. Much prior art describes the preparation of supported zeolite catalysts: many different types of zeolite have been deposited on many different types of support. U.S. Pat. No. 3,244,643 describes a method "for utilising as a support substances which ordinarily would be difficult to composite with the crystalline aluminosilicate into hard particles by conventional pelleting or extruding operations". This aim is accomplished by impregnating a porous, cage-like, solid support with zeolite synthesis gel under conditions that crystals of the zeolite grow within the pores of the support to a size sufficiently large that they are retained within the pore structure of the support but not to a size exceeding the effective diameter of the pores. The exemplified procedure describes the impregnation of particulate supports with the zeolite gel under vacuum.

U.S. Pat. No. 3,730,910 describes the formation of zeolite surfaces on substrates, the surfaces essentially having the same shape and form as the substrate. These shaped materials may be used as catalysts or adsorbents. There is no suggestion that they could form membranes.

U.S. Pat. No. 4,578,372 describes a process for preparing magnetizable catalytically active particles which comprises depositing a layer of zeolite on the surface of magnetizable particles.

Membranes are well known in separation applications, and membranes incorporating zeolites are known. Applied Catalysis 49 (1989) 1–25 is a review of catalysis with permselective inorganic membranes.

Many documents describe membranes in which zeolite crystals are bound to the surface of a porous substrate using a "glue" or binder. Commonly, this takes the form of a layer of amorphous material between the surface and the zeolite. The following documents describe membranes of this type:

(i) DE-A-3827049. This document describes a system comprising a support of micro-porous material with pore sizes less than the mean particle size of the zeolite crystals, which is provided with a "nucleo-active" surface populated by a layer of zeolite crystals bridging the pore openings. This "nucleo-active surface" results in a layer of amorphous material between the surface of the support; this layer is clearly shown in the drawings of the specification.

(ii) CA 1235684 claims a filter for substance separation, comprising a substrate made of a porous glass and a zeolite-based film formed directly on the porous glass, the zeolite-based film having a thickness of 1 micron to 500 micron. The filter is prepared by suspending, for example, a borosilicate glass in an aqueous solution of sodium hydroxide and tetrapropylammonium bromide, and heating in an autoclave. The results of this method of synthesis are shown in Table 2 of the specification. The resulting membrane has a distinct layer of amorphous material between the surface of the support and the zeolite layer. We have reproduced these results, and shown that it is not possible to produce a membrane without a layer of amorphous material using the instructions in the specification.

(iii) JP-A-63287504 describes a separation membrane in which a hydrophobic thin film or a thin film containing a hydrophobic substance is adhered to one surface of a porous inorganic support. The hydrophobic substance can include silicalite or zeolite. As with the documents discussed above, a layer of binder material is used to adhere the crystals to the surface. This is described in Example 3 of the specification, where an alumina sol is deposited on the support surface prior to deposition of the zeolite crystals.

(iv) JP-A-63291809 describes a membrane comprising a film of zeolite on a porous alumina carrier. We have attempted to reproduce the preparation of membranes detailed in the specification, but without success.

(v) EP-A-180200 describes a membrane comprising a porous support impregnated with fine particles of a zeolite. The membrane is prepared by permeating, for example, an ultrafiltration membrane, or a porous glass, with an alkaline solution of ultrafine (e.g. less than 75 angstrom diameter) zeolite particles. These particles become lodged in the pores of the support, where they are "glued" in place using amorphous material.

EP-A-180200 makes reference to earlier EP-A-135069 (EP application no. 84108871.9) from the same inventor, H. Suzuki. This document describes a process for preparing a zeolite membrane in which a zeolite synthesis gel is passed through a microfilter and deposited in a thin film on the surface of a support. In his later document, Suzuki states of the membrane of his earlier document that the zeolite membrane was "... easy peeling, stripping off and difficult to use". Our attempts to produce membranes by repeating Suzuki's instructions have been unsuccessful.

Small-scale zeolite membranes can be bought from Suzuki. Such membranes do not have a continuous coverage of zeolite, and are too fragile to use in any large scale application.

In summary, although there has been extensive research in the field of zeolite membranes, there is no disclosure in the prior art by which a zeolite membrane having a continuous layer of zeolite directly connected to the surface of a support, can be prepared.

SUMMARY OF THE INVENTION

We have now found a process for making such a membrane containing a zeolite or similar material, which produces a high-quality product capable of useful commercial application.

Accordingly, the invention provides a process for the production of a membrane comprising a film of a zeo-type material over the pores of a porous support, which comprises immersing at least one surface of a porous support in a synthesis gel which is capable of crystallising to produce a crystalline zeo-type material; inducing crystallisation of said gel so that zeo-type material crystallises on the support; removing the support from the mix; and repeating these steps one or more times to obtain a membrane in which the zeo-type material is crystallised directly from and bonds directly to the support.

Membranes produced by the process of the present invention are novel. In a further aspect, the present invention provides a membrane which comprises crystals of a zeo-type material carried by a porous support characterised in that the crystal growth of the zeo-type material is essentially continuous over the pores of the support and that the zeo-type material is crystallised directly from and bonds directly to the support.

The membranes according to the invention have two distinct characteristics. First, the zeo-type material is in direct contact with the surface of the support and directly bonds thereto. The nature of the bonding is not fully understood; it may be primarily chemical bonding and/or physical bonding, but in either event the crystals form directly from the support surface without any intermediate "glue" or binder. This is distinct from prior art membranes, for example those described in EP-A-180200, where preformed crystals of zeolite are brought together with the pores of a support and, in effect, glued or cemented in position. In the membranes of the present invention, crystal growth begins at the support surface, and continues outwards continuously, until it cross-links with the crystals growing from the opposite sides of the pores of the support and forms an essentially continuous film of zeo-type material.

Secondly, the zeo-type material presents an essentially continuous crystal growth, each individual crystal growing out from the surface of the support or from the surface of adjacent crystals. This is, again, distinct from prior art membranes where pre-formed crystals are brought into intimate contact and "glued" together, or where coverage of the surface of a support is incomplete. There is no intermediate layer of amorphous material between the support and the crystal growth.

The growth of zeo-type material is essentially continuous over the pores of the support. Preferably, it is essentially continuous over the whole surface of the support. In this case, the layer of zeo-type material may for example be 100 microns thick or even thicker; it may for example be from 1 to 100 microns, especially from 1 to 70 microns, thick. As well as providing a covering over the pores of the support, the growth of zeo-type material may if desired extend through the pores, into the body of the support.

Preferably the crystal growth is completely free from pin-holes. In reality, of course, it may be difficult to produce a perfect membrane, and the term "essentially continuous" is intended to include membranes having a small number of pin-holes in the crystal growth. When membranes are prepared according to the invention, such pin-holes are fissures formed when the faces of growing crystals do not match up exactly. Such-pin holes may be present immediately after preparation of the membrane, but are also likely to occur after dehydration or ion-exchange of the membrane, or during the working life of the membrane. The membranes of the invention are clearly distinct from prior art membranes where the crystal growth has major discontinuities, the growth resulting in macro-pores.

Minor quantities of pin-holes in the membrane can be blocked using a suitable post-treatment, for example using an organic material, for example a polymer or an organo silicon material, or an inorganic material, for example an inorganic silicon material, capable of cross-linking with silicon and oxygen atoms.

The essentially continuous crystal growth in the membranes according to the invention, supplemented if necessary by a post-treatment, is such that there is no access from one side of the membrane to the other except through the intra-crystalline pores of the zeo-type material.

Zeo-type materials are well known, and are often referred to as molecular sieves. They are characterised by having a crystal structure made up of tetrahedra joined together through oxygen atoms to produce an extended network with channels of molecular dimensions. Any zeo-type material may be used in the present invention, depending on the desired use of the membrane. Zeolites, or aluminosilicates, are the best known example of zeo-type materials. Any zeolite may be used in the present invention, for example those having LTA, MEL, MFI or TON structure types as defined in "Atlas of Zeolite Structure Types" Meier and Olsen, 1987, Polycrystal Book Service, Pittsburg U.S.A. Other zeo-type materials which may be used include metallosilicates in which some or all of the aluminium is replaced by another metal, such as gallium, boron, zinc, iron or titanium, and crystalline silicates having zeolite-type structure, such as silicalites as described in U.S. Pat. No. 4,061,724 or Nature, 280, 664–665 (1979).

A further class of zeo-type materials are the crystalline aluminophosphates ("ALPO's"), silicoaluminophosphates ("SAPO's") and other metalloaluminophosphates. Such materials are described for example in "New Developments in Zeolite Science and Technology", Proceedings of the 7th International Zeolite Conference, Tokyo, 1986, page 103. More recent materials such as ALPO-8, ALPO-54 and MCM-9 may be prepared for example as referred to in Zeolites 9 September 1989, page 436.

A membrane is a continuous structure whose width and length are very much greater than its thickness. It is selectively permeable to liquids or gases. Any suitable porous support having the desired physical shape may be used in the present invention; suitable forms include flat sheet, tubular or spiral wound forms. Suitable materials are, for example, porous metal, ceramic, cermet, glass, mineral, carbon or polymer. Typical metals include stainless steels, Inconel, Hastalloy, Fecralloy, chromium and titanium. The metal may be in the form of a fibrous mesh (e.g. Bekipor filters), a combination of fibrous metal with sintered metal particles (e.g. Pall PMM metal filter and Supramesh filter), or sintered metal filters (e.g. Pall PSS filter media). Woven metal filter media may also be used. Inconel, Hastalloy, Fecralloy, Bekipor, Pall and Supramesh are Trade Marks.

Typical polymeric substances include any type of filtration media including woven and non-woven media. These may optionally be coated with metal or metal oxide films.

Porous ceramic, glass, carbon or mineral media may be used including porous carbons, silicon carbide, porous clays or other silicate minerals, e.g. kaolin, vermiculite, montmorillonite and pillared clays, aerogels or supported aerogels and supported porous silica. The support may itself be a zeolite, formed into a suitable shape using a binder. By choice of a suitable support, very robust membranes may be produced. The use of metal supports is especially preferred.

The pore size of the support is an important parameter. Many prior art membranes have used supports with very small pore sizes. A major advantage of the present invention is that it enables a support with a large pore size to be used. In particular, the pore diameter can be larger than the average crystal size of the zeo-type material. Large pores are advantageous because they permit the preparation of high surface area membranes, and thus maximise flux. Preferably, the average pore diameter of a support used in the present invention is in the range of from 0.1 to 2000 microns, preferably 1 to 2000 microns, especially 5 to 200 microns. For pores of up to 300 microns diameter, the pore size may be determined by the technique of bubble point pressure as defined by ISO4003, and the pore size distribution may be measured by a Coulter porometer (Trade Mark). For larger pores, optical microscopy methods may be used.

It may be necessary to prepare the surface of the support before carrying out the process according to the invention to ensure a firm bond with the crystal growth of zeo-type material. Suitable treatments will of course depend on the support; soaking in acid, for example hydrochloric acid, may be advantageous for metallic supports. The support may advantageously incorporate a surface coating of nickel, cobalt or molybdenum in the form of the metal and/or the oxide.

The synthesis gel used in the process of the present invention may be any gel which is capable of producing the desired crystalline zeo-type material. Gels for the synthesis of zeo-type materials are well known, and are described in the prior art given above or, for example, in EP-A-57049, EP-A-104800, EP-A-2899 and EP-A-2900. Standard text books by D. W. Breck ("Zeolite Molecular Sieves, Structure Chemistry and Use", published by John Wiley, 1974) and P. A. Jacobs and J. A. Martens (Studies in Surface Science and Catalysis, No. 33, "Synthesis of High Silica Aluminosilicate Zeolites", published by Elsevier, 1987) describe many such synthesis gels. The process according to the present invention includes conventional syntheses of zeo-type materials, except that the synthesis is carried out in the presence of the porous support. Most commonly, gels are crystallised by the application of heat. Pressure may also be applied, but it is usually convenient to conduct the crystallisation under autogenous pressure.

Preferably, the porous support is completely immersed in the synthesis gel; alternatively, if desired, only one surface of the support may be in contact with the gel. This may be useful, for example, if it is desired to produce a membrane in the form of a tube where only the inside or the outside of the tube needs to be in contact with the gel. It may also be useful if it is desired to produce a membrane containing two different zeolites, one on each side of the support. Use of such a bi-functional membrane would be equivalent to using two separate membranes each carrying a different zeolite.

A crucial factor in the process of the invention is that, after the support has been immersed in one synthesis gel which is then crystallised, it is then removed and immersed in a second gel, and the crystallisation repeated. We have found that, after the first crystallisation, the support has growing upon it a number of zeo-type crystals. These crystals, however, are not sufficient to produce a continuous crystal growth over the whole surface. After the support has been subjected to a second crystallisation, more crystals have been grown, either directly from the surface of the support or from the surface of the crystals formed in the first crystallisation which have themselves directly grown on the support surface. The process of immersion and crystallisation is then repeated as required, preferably until a complete and continuous coverage of the support surface is obtained. The number of immersions required will of course depend on the pore size of the support, the nature of the zeo-type material and the synthesis conditions; at least 2 immersions are essential but more than 2, for example from 3 to 10, immersions may be desirable.

Preferably, after removal of the support from the mixture after crystallisation, gel and loose material are removed, for example by washing thoroughly, before carrying out the subsequent immersion and crystallisation. The support may also if desired be dried in between each immersion. Drying for at least 12 hours at ambient temperature, at a temperature of 30°–50° C. for at least 2 hours, or at a temperature of 80°–100° C. for 15 to 30 minutes, are suitable regimes.

The repeated immersion and crytallisation steps enable the use of a support with a large pore size. In general, processes used for the preparation of prior art membranes have been such that the only membranes which could be produced were those based on supports having relatively small pores. Such membranes are of very limited commercial usefulness.

The membranes of the invention have a wide range of applications. They may for example be used for dehydration, for example to remove water from materials such as LPG, natural gas or alcohols. Membranes of the present invention are very much more effective than the traditionally used organic polymer membranes, for example the commercially available caesium polyacrylate membranes described in WO 86/00819, in dehydrating mixtures of water with other liquids; they have the additional advantage of being useful at relatively high temperatures.

They may be used for removing linear alkanes, olefins or other functionalised hydrocarbons from a mixture containing more highly branched compounds, for example in the octane-enhancing of fuels, reforming, dewaxing, or the separation of normal and iso butanes.

Combined catalysis and separation processes are another important application. Examples include hydrogenation and dehydrogenation of linear hydrocarbons in the presence of more highly branched compounds such as isoalkanes, isoalkenes and aromatics. The membranes of the invention may be used in catalysis to shift thermodynamic equilibria towards desired products, for example by removal of hydrogen from a dehydrogenation reaction or removal of water from an esterification reaction or an alcohol dehydrogenation.

BRIEF DESCRIPTION OF THE DRAWINGS

The invention consists of the novel parts, construction, arrangements, combinations and improvements shown and described. The accompanying figures and drawings, which are incorporated and constitute a part of the specification illustrate the invention and, together with the description, serve to explain the principles of the invention.

Of the Drawings.

DESCRIPTION OF THE PREFERRED EMBODIMENTS

The following Examples illustrate the invention.

Except where otherwise stated, the chemicals used in the Examples are:

Sodium Aluminate: ex BDH technical grade nominally containing 40% $Al_2O_3$, 30% $Na_2O$ and 30% $H_2O$ Sodium Silicate: ex BDH specific gravity 1.57

Triethanolamine: ex BDH

Ludox AS40: ex DuPont, 40% w silica in $H_2O$ (Trade Mark)

EXAMPLE 1

Preparation of Membranes

Figure 1:
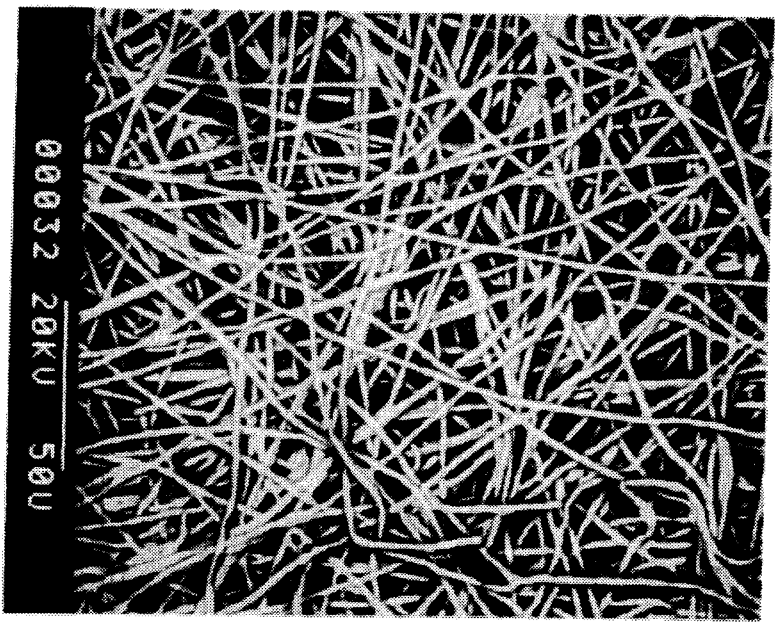
FIG. 1 is a scanning electron micrograph (SEM), at a magnification ×500, of a Bekipor NP20.01 filter.

The substrate used was a Bekipor (Trade Mark) NP20.01 filter. This consists of very fine 316 stainless steel fibres brought together in a 3-dimensional labyrinthic structure. The fibres are arranged randomly into a homogeneous web. This web is further compacted and sintered to give a very strong metallic bond at each fibre crossing. The average pore size is approximately 5 microns and the diameter of the wires on the top surface is 2 microns. FIG. 1 is a scanning electron micrograph (SEM), magnification ×500, of this filter.

A 7 cm diameter disc was cut out from a sheet of the above material and degreased by soaking it in a beaker containing approximately 200 ml of toluene for 1 hour (liquor being replaced 3 times). The toluene was then replaced by acetone and the washing procedure repeated. The metal mesh was subsequently air dried by carefully placing it in a clean petri dish, loosely covering with aluminium foil and placing in a fume cupboard overnight.

The clean, dry metal mesh was removed from the petri dish and placed in a QVF (Trade Mark) glass tube (80 cm diameter). The mesh was placed with its coarse mesh face facing downwards. Care was taken not to contaminate the metal, by using rubber gloves. The QVF tube was equipped with PTFE end plates which were held in place by stainless steel flanges held in place by metal nuts and bolts. The vessel had previously been cleaned by washing it with distilled water, acetone, toluene and finally acetone before being dried in a stream of clean, dry air.

Two solutions, A and B, were prepared separately as follows in two 16 oz glass bottles.

Solution A: 34.4 g sodium aluminate (BDH Technical Grade) and 155.0 g distilled, deionised water. The aluminate, nominal composition 40% $Al_2O_3$, was analysed; the analysis gave the composition 27.44% $Na_2O$, 43.36% $Al_2O_3$ and 29.20% $H_2O$.

The components were mechanically shaken until dissolved.

Solution B: 53.4 g sodium silicate specific gravity 1.57 (BDH): analysis of this material gave 13.53% $Na_2O$, 29.28% $SiO_2$ and 57.20% $H_2O$. 155.0 g distilled, deionised water were added.

Solution A was added slowly to solution B with both stirring and shaking (by hand) to ensure complete and even mixing (it is important to ensure that no lumps of hydrogel are formed). This resulted in a hydrogel having the nominal molar composition:

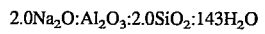

$$2.0Na_2O:Al_2O_3:2.0SiO_2:143H_2O$$

The molar composition based on the analysis figures above was:

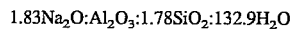

$$1.83Na_2O:Al_2O_3:1.78SiO_2:132.9H_2O$$

The hydrogel was slowly poured into the QVF tube containing the metal mesh. The tube was sealed with the second PTFE disc and metal end flanges and placed in an oven pre-heated to 90° for 24 hours. Subsequently it was removed and allowed to cool for 1 hour. The tube was opened at one end and the solution poured away whilst the metal mesh was carefully removed with a long flat rod ensuring that the mesh was not bent or damaged in any way. The mesh was placed in a glass beaker and washed three times with 100 ml aliquots of distilled, deionised water, swirling the solution each time to ensure complete removal of residues. The mesh was air dried in a petri dish overnight, as before.

The surface of the dried zeolite coated mesh was subsequently wiped with a clean lens tissue in order to remove any loose, powdery deposits which may have formed on the surface. The mesh was inverted and the process repeated.

Figure 2:
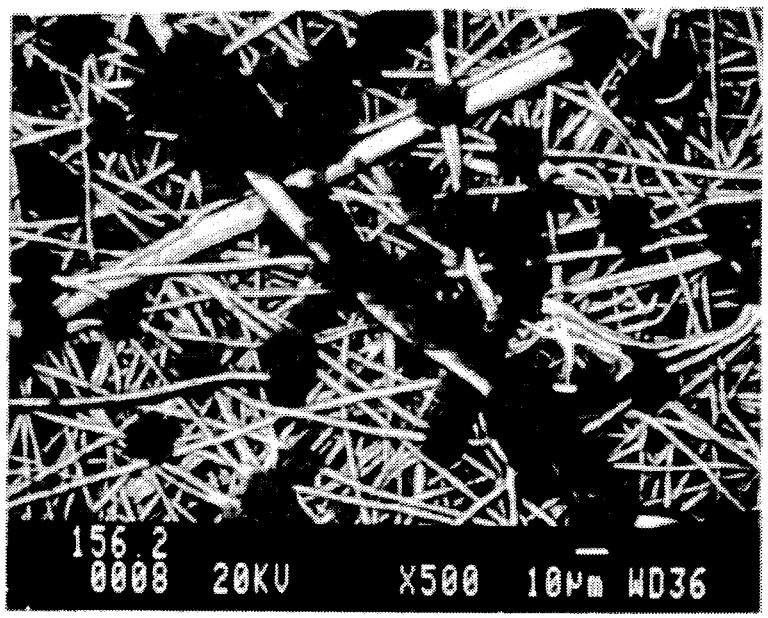
FIG. 2 is an SEM of the filter of FIG. 1 including a first zeolite film at a magnification of ×500.
Figure 3:
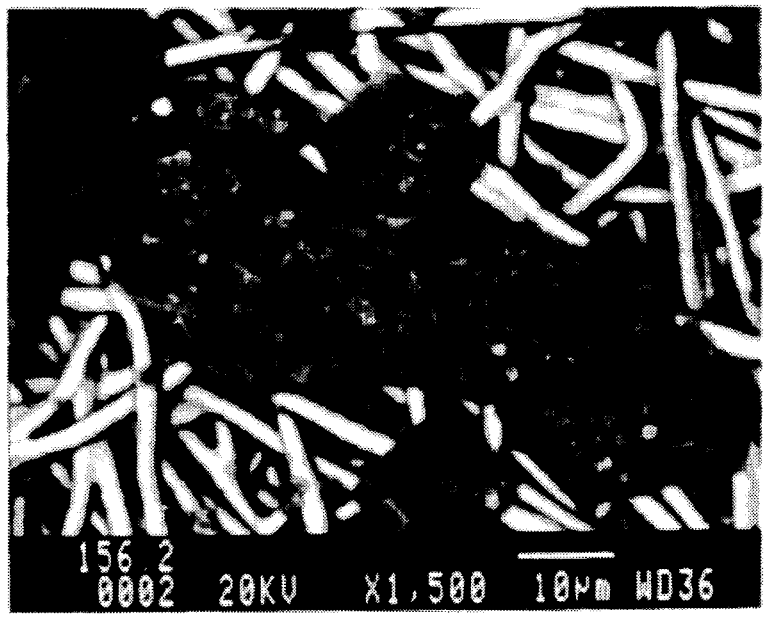
FIG. 3 is an SEM of the filter of FIG. 1 including a first zeolite film at a magnification of ×1500.

The mesh was re-inverted and the top face cleaned again. It was then washed with water and left to dry overnight. FIGS. 2 and 3 are SEM's of the resulting product at magnifications ×500 and ×1500 respectively. The dark areas of the SEM clearly show the cubic crystal growth of zeolite directly on the steel fibres. Coverage of the support is far from complete.

The QVF tube was cleaned (as before), the mesh carefully placed inside (as before) and fresh hydrogel solution, prepared as described above, added. This growth and cleaning procedure was repeated two more times.

The resulting mesh had a coating of zeolite 4A. It was examined by X-ray diffraction, and the results are given in Table 1. Table 2 gives the known XRD pattern of zeolite A, (LTA), taken from the standard text by Breck, above, and Table 3 gives the XRD pattern of a bulk zeolite obtained by a method identical to that of Example 1 except that no membrane support was present. Comparison shows that the growth on the membrane is indeed zeolite A.

Figure 4:
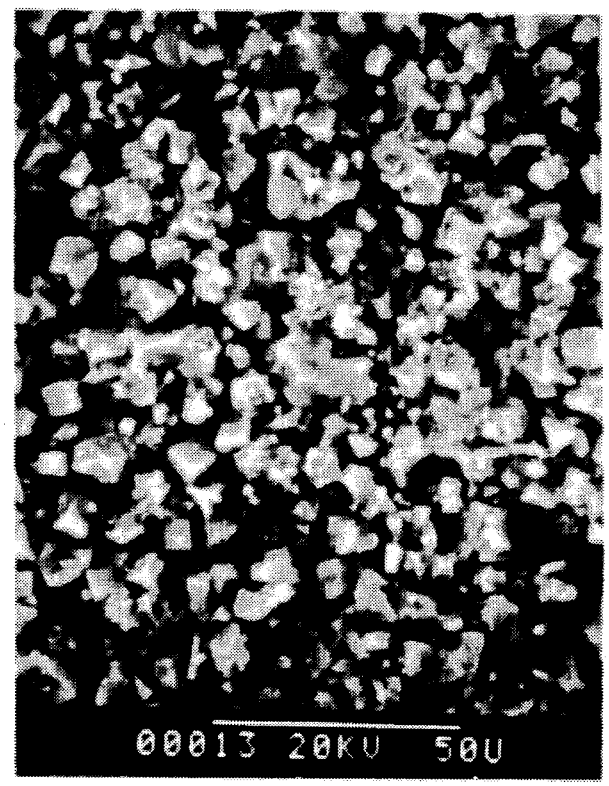
FIG. 4 is an SEM, magnification ×750, of the filter of FIG. 1 demonstrating the membrane of the current invention.

FIG. 4 shows an SEM, magnification ×750, of the finished membrane. Complete coverage of the support surface is apparent.

Figure 5:
FIG. 5 is an SEM, magnification ×1000, of the membrane of FIG. 4 in cross-section.

FIG. 5 shows an SEM, magnification ×1000, of the finished membrane in cross-section. The lower half 1 of the figure shows the stainless steel wires. The upper part 2 of the figure shows the continuous growth of zeolite, which can be seen to be thick and continuous, and to penetrate down into the body of the support. The light feature 3 is mechanical damage caused by cutting the membrane to obtain a cross-sectional sample.

TABLE 1

XRD of membrane prepared in Example 1

| D-spacings A° | Relative Intensities $100 \times I/I_{max}$ |
|---|---|
| 12.14 | 100 |
| 8.62 | 90 |
| 7.04 | 53 |
| 5.47 | 40 |
| 4.33 | 11 |
| 4.08 | 59 |
| 3.69 | 91 |
| 3.40 | 24 |
| 3.27 | 77 |
| 2.97 | 88 |
| 2.74 | 18 |
| 2.61 | 52 |
| 2.50 | 7 |
| 2.45 | 7 |
| 2.16 | 9 |
| 2.05 | 11 |
| 1.92 | 7 |
| 1.74 | 14 |
| 1.69 | 8 |
| 1.60 | 7 |
| 1.57 | 6 |

Variation in intensities of ± 20%
Variation in 2θ positions of ± 0.2° with corresponding variation in D-spacings
Peaks with $100 \times I/I_{max}$ less than 5% excluded
Copper alpha wavelength 1.54060 ANG
X-ray diffractometer: Philips PW 1820/00
Slits: ¼°, 0.2°, ¼°
2θ scan: 5°–60°
Step size: 0.025°
Time: 10 sec

TABLE 2

XRD of zeolite 4A-Na form
From "Zeolite Molecular Sieves Structure, Chemistry and Use", by Donald W Breck

| D-spacings A° | Relative Intensities $100 \times I/I_{max}$ |
|---|---|
| 12.29 | 100 |
| 8.71 | 69 |
| 7.11 | 35 |
| 5.51 | 25 |
| 5.03 | 2 |
| 4.36 | 6 |
| 4.107 | 36 |
| 3.714 | 53 |
| 3.417 | 16 |
| 3.293 | 47 |
| 2.987 | 55 |
| 2.904 | 9 |
| 2.754 | 12 |
| 2.688 | 4 |
| 2.626 | 22 |
| 2.515 | 5 |
| 2.464 | 4 |
| 2.371 | 3 |
| 2.289 | 1 |
| 2.249 | 3 |
| 2.177 | 7 |
| 2.144 | 10 |
| 2.113 | 3 |
| 2.083 | 4 |
| 2.053 | 9 |

TABLE 3

XRD of Bulk Zeolite prepared by the method of Example 1

| D-spacings A° | Relative Intensities $100 \times I/I_{max}$ |
|---|---|
| 12.18 | 100 |
| 8.64 | 66 |
| 7.06 | 34 |
| 5.48 | 23 |
| 4.33 | 7 |
| 4.09 | 33 |
| 3.70 | 52 |
| 3.40 | 16 |
| 3.28 | 46 |
| 2.98 | 55 |
| 2.89 | 9 |
| 2.74 | 10 |
| 2.62 | 33 |
| 2.17 | 6 |
| 2.05 | 7 |
| 1.92 | 5 |
| 1.74 | 5 |
| 1.69 | 5 |

Variation in intensities of ± 20%
Variation in 2θ positions of ± 0.2° with corresponding variation in D-spacings
Peaks with $100 \times I/I_{max}$ less than 5% excluded
Copper alpha wavelength 1.54060 ANG
X-ray diffractometer: Philips PW 1820/00
Slits: ¼°, 0.2°, ¼°
2θ scan: 5°–60°
Step size: 0.025°
Time: 10 sec

EXAMPLE 2

The method of Example 1 was repeated except that the Bekipor filter was replaced with a Pall PMM M020 filter. This is a regular mesh of 316 stainless steel with 316 stainless steel particles sintered within the mesh. The average pore size measured by Coulter porometer is 2 microns.

Figure 6:
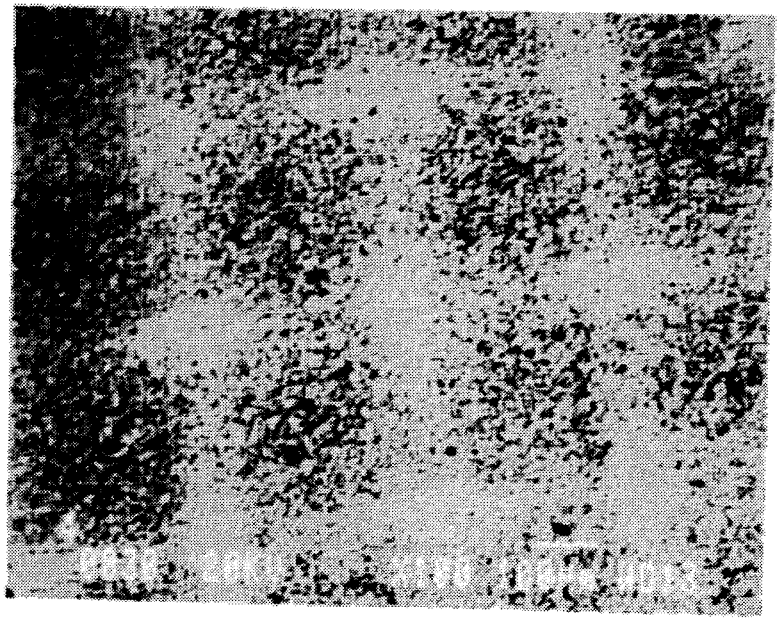
FIG. 6 is an SEM, magnification ×100, of a PMM M020 filter.

FIG. 6 is an SEM, magnification ×100, of this filter.

Figure 7:
FIG. 7 is an SEM of the filter of FIG. 6 including a first zeolite film at a magnification of ×500.
Figure 8:
FIG. 8 is an SEM of the filter of FIG. 6 including a first zeolite film at a magnification of ×1500.
Figure 9:
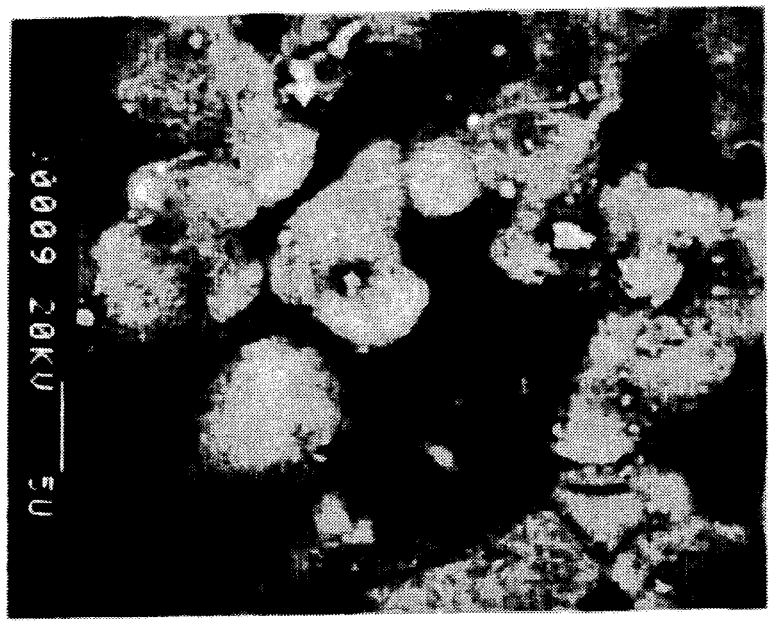
FIG. 9 is an SEM of the filter of FIG. 6 including a first zeolite film at a magnification of ×3000.

FIGS. 7 and 8 show the mesh after one immersion and crystallisation of zeolite at magnifications ×500 and ×1500 respectively. The light areas are the stainless steel support, the dark areas show the zeolite growth. Coverage of zeolite is incomplete. FIG. 9 is an SEM at magnification ×3000 of the same mesh, and shows a large cubic crystal within a pore of the support. The crystal is larger than the entrance to the pore, making it clear that the crystal grew within the pore: it could not have been grown in the hydrogel and then deposited within the pore.

Figure 10:
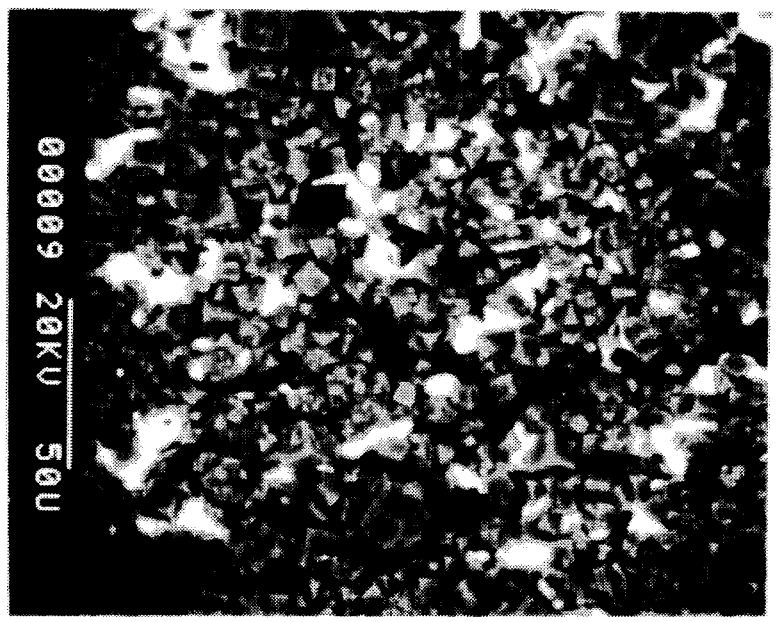
FIG. 10 is an SEM, magnification ×500, of the filter of FIG. 6 after two hydrogel solution immersions.
Figure 11:
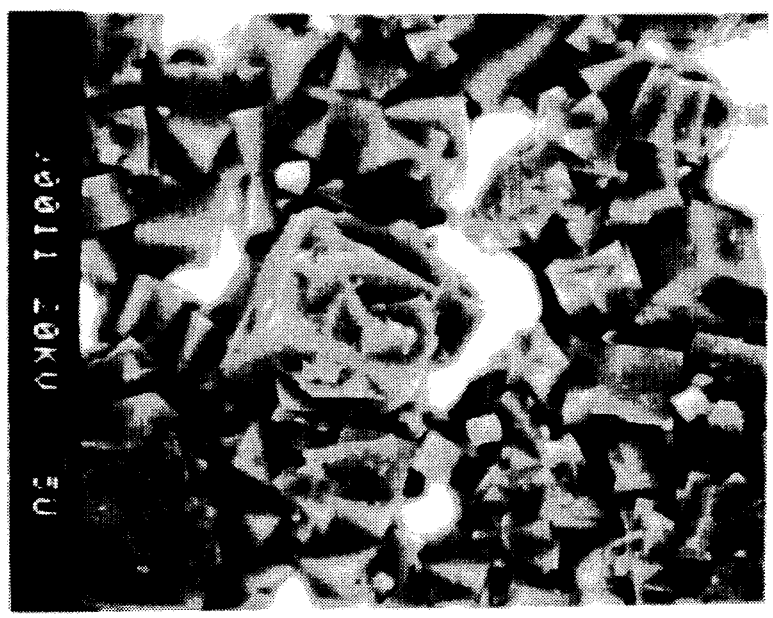
FIG. 11 is an SEM, magnification ×1500, of the filter of FIG. 7 after two hydrogel solution immersion.

FIGS. 10 and 11 show the mesh after two immersions and crystallisations of zeolite at magnifications ×500 and ×1500 respectively. Compared with FIGS. 7 and 8, the very much greater coverage is readily apparent. However, the coverage is still not complete, light areas of the support still being visible.

Figure 14:
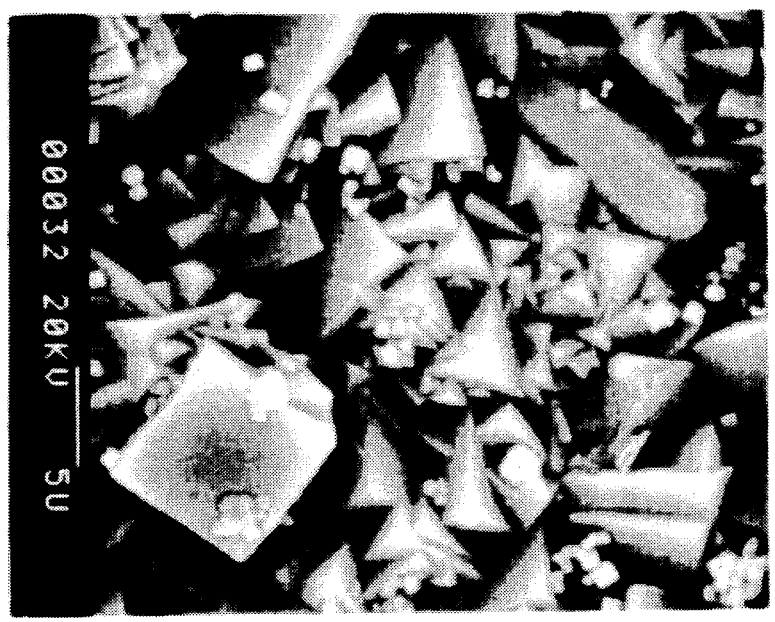
FIG. 14 is an SEM, magnification ×3000, of the filter of FIG. 7 demonstrating the finished membrane of the current invention.
Figure 12:
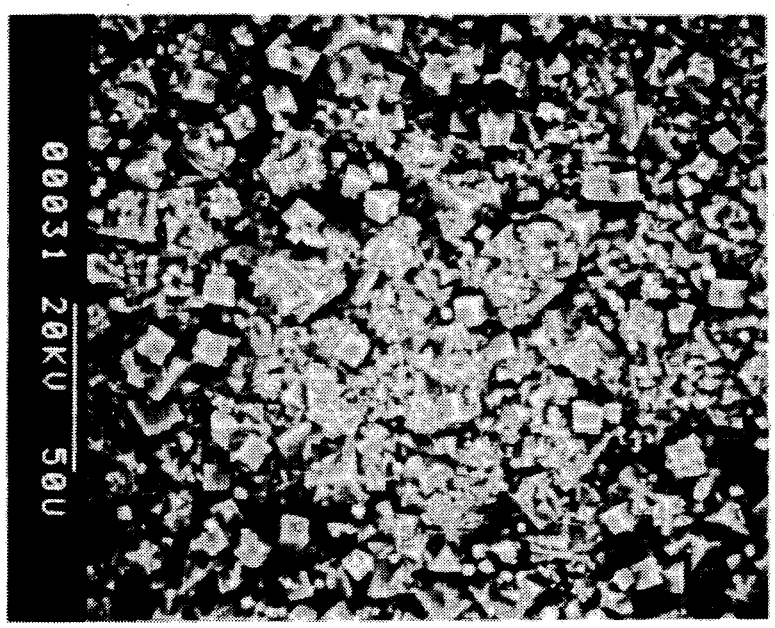
FIG. 12 is an SEM, magnification ×500, of the filter of FIG. 7 demonstrating the finished membrane of the current invention.
Figure 13:
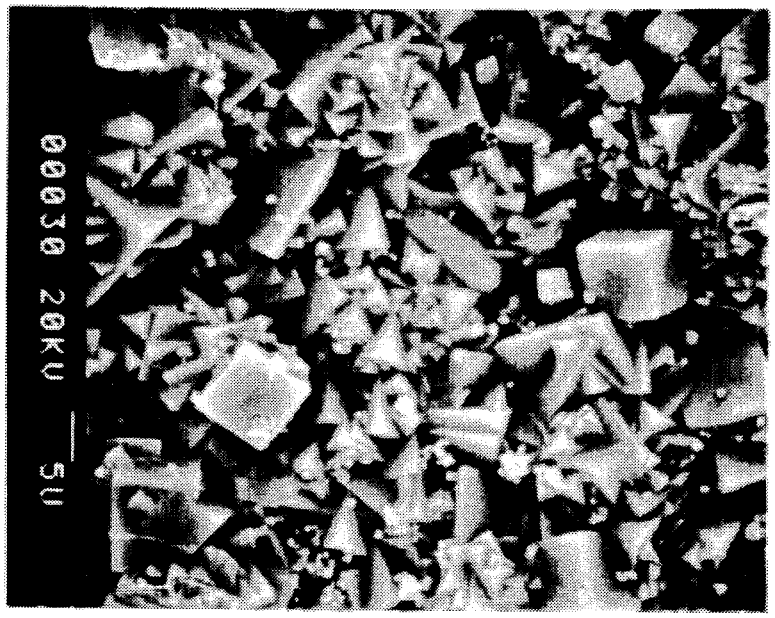
FIG. 13 is an SEM, magnification ×1500, of the filter of FIG. 7 demonstrating the finished membrane of the current invention.

FIGS. 12, 13 and 14 show the mesh after three immersions and crystallisations of zeolite at magnifications ×500, ×1500 and ×3000 respectively. The zeolite now completely covers the surface of the support. This is the finished membrane according to the invention.

EXAMPLE 3

The procedure of Example 1 was followed except that the filter used was Bekipor ST5BL3. This filter is identical to the filter used in Example 1 except that the average pore diameter is 5.3 microns measured by Coulter porometer, and the wire diameter on the top surface is 6.5 microns.

Figure 15:
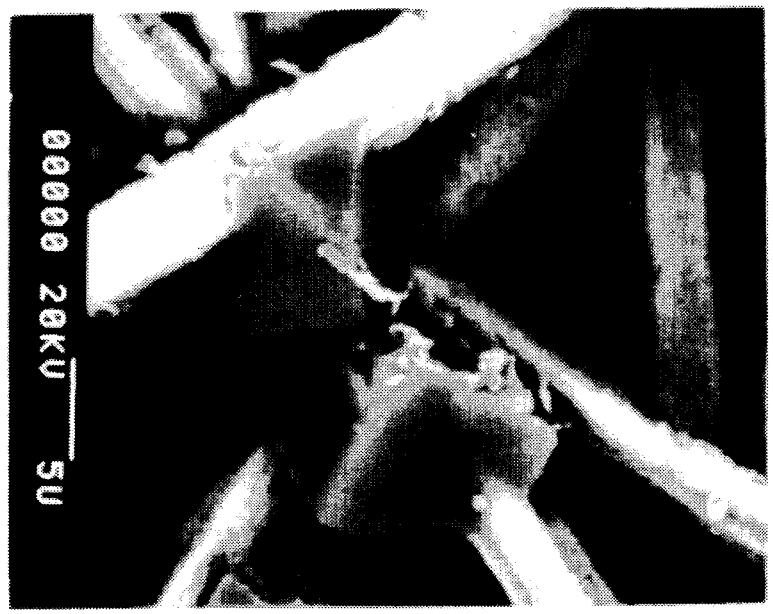
FIG. 15 is an SEM, magnification ×3000, of a Bekipor ST5BL3 filter after one hydrogel solution immersion.

FIG. 15 is an SEM, magnification ×3000, of the mesh after a single immersion and crystallisation of zeolite. It shows clearly that the crystals are growing directly from the surface of the support. There is no intermediate layer of any substance which might act as a glue or binder.

EXAMPLE 4

The procedure of Example 3 was followed except that, prior to immersion in the hydrogel, the filter was treated as follows.

The filter was soaked in a toluene solution for 1 hour, then rinsed in an acetone solution and air dried overnight in a covered dish. It was then soaked in a beaker containing 1 molar hydrochloric acid solution overnight at room temperature, washed with distilled water and air dried.

Figure 16:
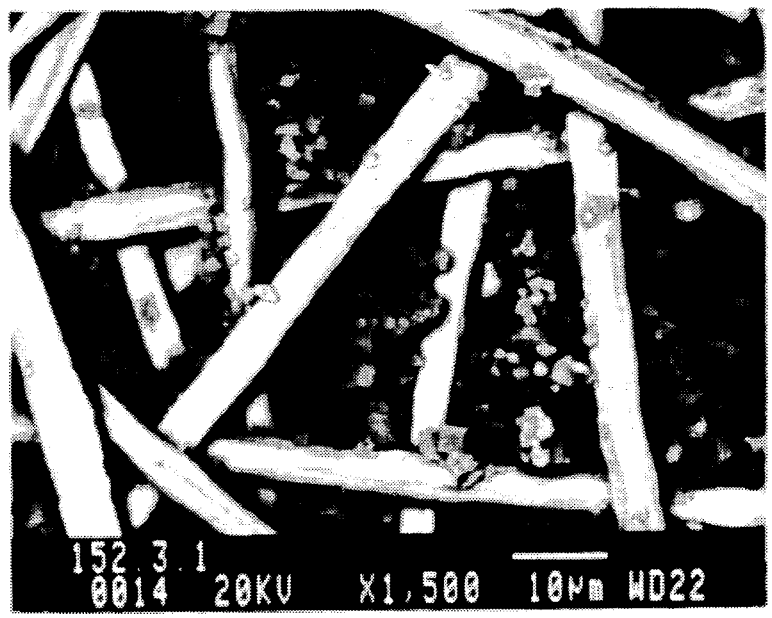
FIG. 16 is an SEM, magnification ×1500, of a Bekipor ST5BL3 filter, pretreated and subjected to one hydrogel solution immersion.

FIG. 16 is an SEM, magnification ×1500, of the mesh after a single immersion and crystallisation of zeolite. A good initial coverage of relatively small zeolite crystals is obtained.

EXAMPLE 5

The procedure of Example 3 was followed, except that, prior to immersion in the hydrogel, the filter was treated as follows.

The filter was soaked in a toluene solution for 1 hour, then rinsed in an acetone solution and air dried overnight in a covered dish. The filter was then provided with a coating of nickel 30 Angstroms thick using the technique of Rf sputtering.

In this technique, the thermal energy used in evaporation is replaced by the kinetic energy of ions which bombard the surface of a source target. An r.f. field is used to strike the argon plasma between two parallel electrodes. The powered target electrode is bombarded by argon ions. This bombardment of the target leads to a vapour being produced. Condensation of this vapour on the substrate leads to film formation. An Edwards EMS100 Sputter Coater was used, with Rf power 300 W and a pressure of 0.12 mbar. The resulting filter was used in the procedure of Example 1.

Figure 17:
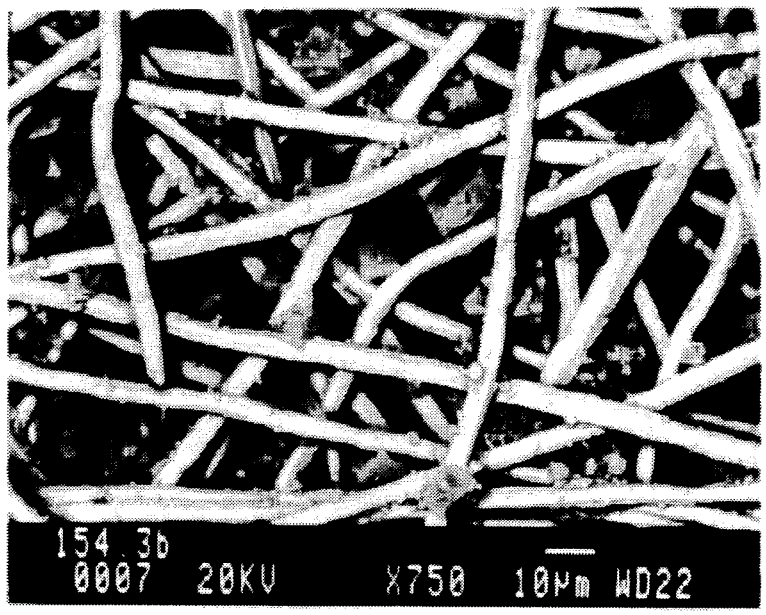
FIG. 17 is an SEM, magnification ×750, of a Bekipor ST5BL3 filter, alternatively pretreated and subjected to one hydrogel solution immersion.

FIG. 17 is an SEM, magnification ×750, of the mesh after a single immersion and crystalliation of zeolite. A good initial coverage of relatively small zeolite crystals is obtained.

EXAMPLE 6

Figure 18:
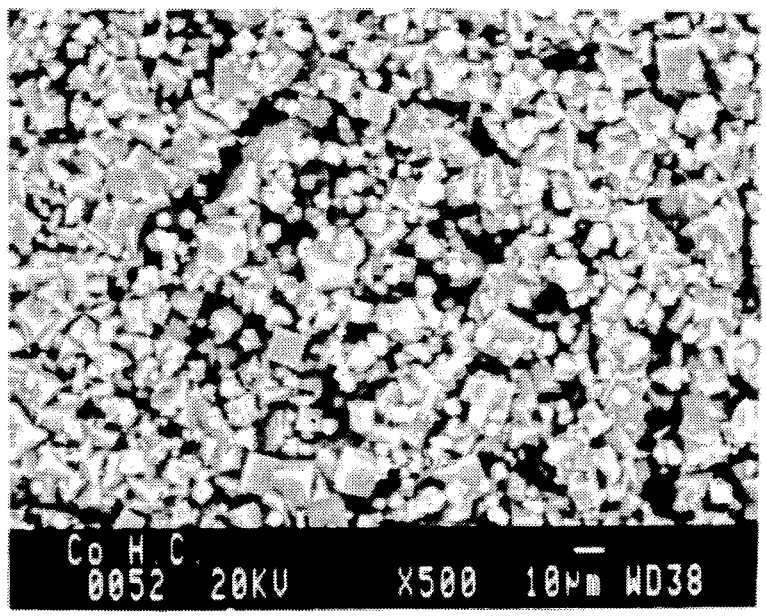
FIG. 18 is an SEM, magnification ×500, of a Bekipor ST5BL3 filter, alternatively pretreated and subjected to one hydrogel solution immersion.

The procedure of Example 5 was followed, except that cobalt was deposited on the filter instead of nickel. FIG. 18 is an SEM, magnification ×500, of the mesh after a single immersion and crystallisation of zeolite. A very good initial coverage of zeolite is obtained.

In a further experiment, after coating the filter with nickel, the filter was heated in an air stream for 6 hours at 550° C. Visual examination indicated results similar or possibly slightly superior to those obtained without the oxidising step.

EXAMPLE 7

The procedure of Example 2 was followed but with the following exceptions:

Solution A:
17.8 g sodium aluminate
44.8 g triethanolamine
157.0 g distilled, deionised water Solution B:
22.4 g sodium silicate specific gravity 1.57
157.0 g distilled, deionised water Analysis of the aluminate and silicate was as in Example 1.

The resulting hydrogel had the nominal composition:

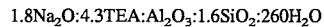
$1.8Na_2O:4.3TEA:Al_2O_3:1.6SiO_2:260H_2O$ (TEA=triethanolamine)

The molar composition based on the analysis figures was:

$1.68Na_2O:3.96TEA:Al_2O_3:1.44SiO_2:243.34H_2O$

The QVF tube containing the mesh and the mixture of solutions A and B was kept in the oven for 72 hours for each crystal growth. After cleaning as described above, the mesh after two growths gave the XRD pattern of Table 4, and the mesh after three growths gave the XRD pattern of Table 5. Both indicate the presence of zeolite A. Table 6 gives the XRD pattern of a bulk zeolite prepared by the method of Example 7.

Figure 19:
FIG. 19 is an SEM, magnification ×1500, of a Bekipor NP20.01 filter after one alternative hydrogel solution immersion.
Figure 20:
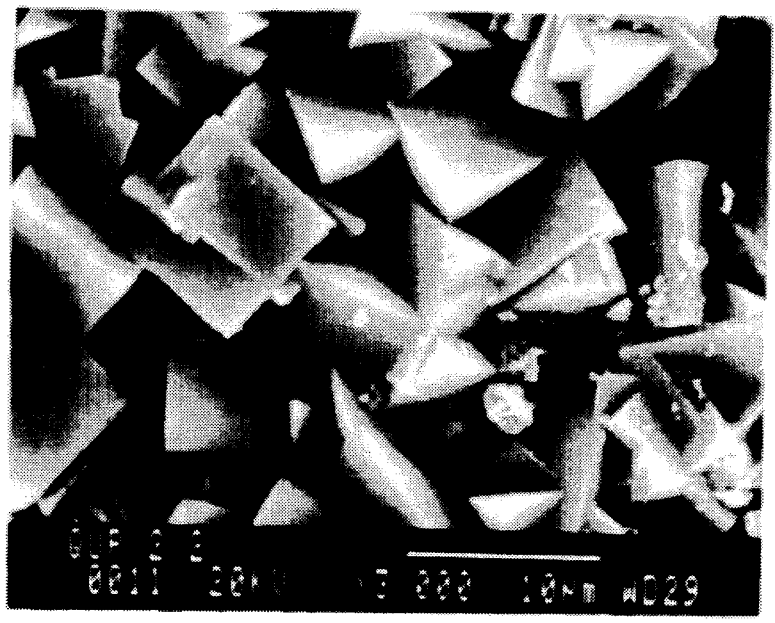
FIG. 20 is an SEM, magnification ×3000, of the filter of FIG. 19 after two hydrogel solution immersions.
Figure 21:
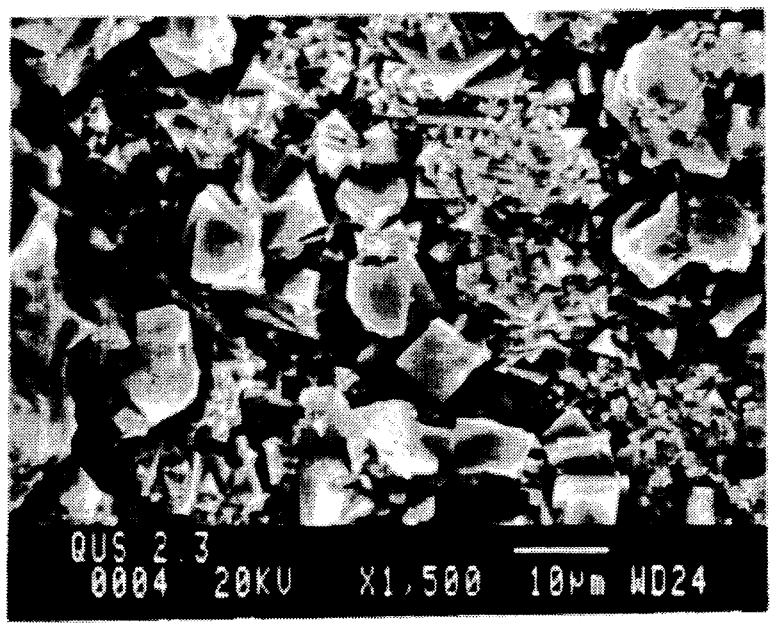
FIG. 21 is an SEM, magnification ×1500, of the filter of FIG. 20 after three hydrogel solution immersions.

FIGS. 19, 20 and 21 are SEM's of the mesh after 1, 2 and 3 growths respectively. FIG. 19 is magnification ×1500, and shows light areas of the support and dark areas of zeolite growth. FIG. 20 is magnification ×3000, and shows that a complete coverage of the surface has occurred. A high degree of twinning of the crystals is apparent. FIG. 21 is magnification ×1500, and shows the deposit of additional small zeolite crystals.

TABLE 4

XRD of Membrane of Example 7 After 2 Growths

| D-spacings A° | Relative Intensities $100 \times I/I_{max}$ |
|---|---|
| 12.06 | 100 |
| 8.57 | 52 |
| 7.01 | 28 |
| 5.45 | 15 |
| 4.31 | 4 |
| 4.07 | 32 |
| 3.68 | 30 |
| 3.39 | 8 |
| 3.27 | 25 |
| 2.97 | 28 |
| 2.88 | 5 |
| 2.74 | 5 |
| 2.67 | 2 |
| 2.61 | 16 |
| 2.17 | 3 |
| 2.04 | 4 |
| 1.92 | 2 |
| 1.92 | 2 |
| 1.73 | 4 |
| 1.69 | 2 |

Variation in intensities of ± 20%
Variation in 2θ positions of ± 0.2° with corresponding variation in D-spacings
Peaks with $100 \times I/I_{max}$ less than 2% excluded
X-ray diffractometer: Philips PW 1820/00
Slits: ¼°, 0.2°. ¼°
2θ scan: 5°–60°
Step size: 0.025°
Time: 10 sec

TABLE 5

XRD of Membrane of Example 7 after 3 Growths

| D-spacings A° | Relative Intensities $100 \times I/I_{max}$ |
|---|---|
| 12.16 | 100 |
| 8.62 | 92 |
| 7.05 | 82 |
| 5.48 | 33 |
| 4.33 | 10 |
| 4.08 | 55 |
| 3.70 | 66 |
| 3.40 | 19 |
| 3.28 | 68 |
| 2.98 | 76 |
| 2.89 | 12 |
| 2.74 | 13 |
| 2.62 | 57 |
| 2.51 | 6 |
| 2.17 | 8 |
| 2.05 | 6 |
| 1.92 | 7 |
| 1.74 | 11 |

Variation in intensities of ± 20%
Variation in 2θ positions of ± 0.2° with corresponding variation in D-spacings
Peaks with $100 \times I/I_{max}$ less than 5% excluded
Copper alpha wavelength 1.54060 ANG
X-ray diffractometer: Philips PW 1820/00
Slits: ¼°, 0.2°. ¼°
2θ scan: 5°–60°
Step size: 0.025°
Time: 10 sec

TABLE 6

XRD of Bulk Zeolite prepared by the method of Example 7

| D-spacings A° | Relative Intensities $100 \times I/I_{max}$ |
|---|---|
| 12.33 | 100 |
| 8.72 | 62 |
| 7.12 | 34 |
| 5.51 | 24 |
| 4.35 | 7 |
| 4.10 | 41 |
| 3.71 | 58 |
| 3.42 | 19 |
| 3.29 | 51 |
| 2.98 | 65 |

Variation in intensities of ± 20%
Variation in 2θ positions of ± 0.2° with corresponding variation in D-spacings
Peaks with $100 \times I/I_{max}$ less than 5% excluded
Copper alpha wavelength 1.54060 ANG
X-ray diffractometer: Philips PW 1820/00
Slits: ¼°, 0.2°. ¼°
2θ scan: 5°–60°
Step size: 0.025°
Time: 10 sec

EXAMPLE 8

Membrane Test Procedure

Figure 22:
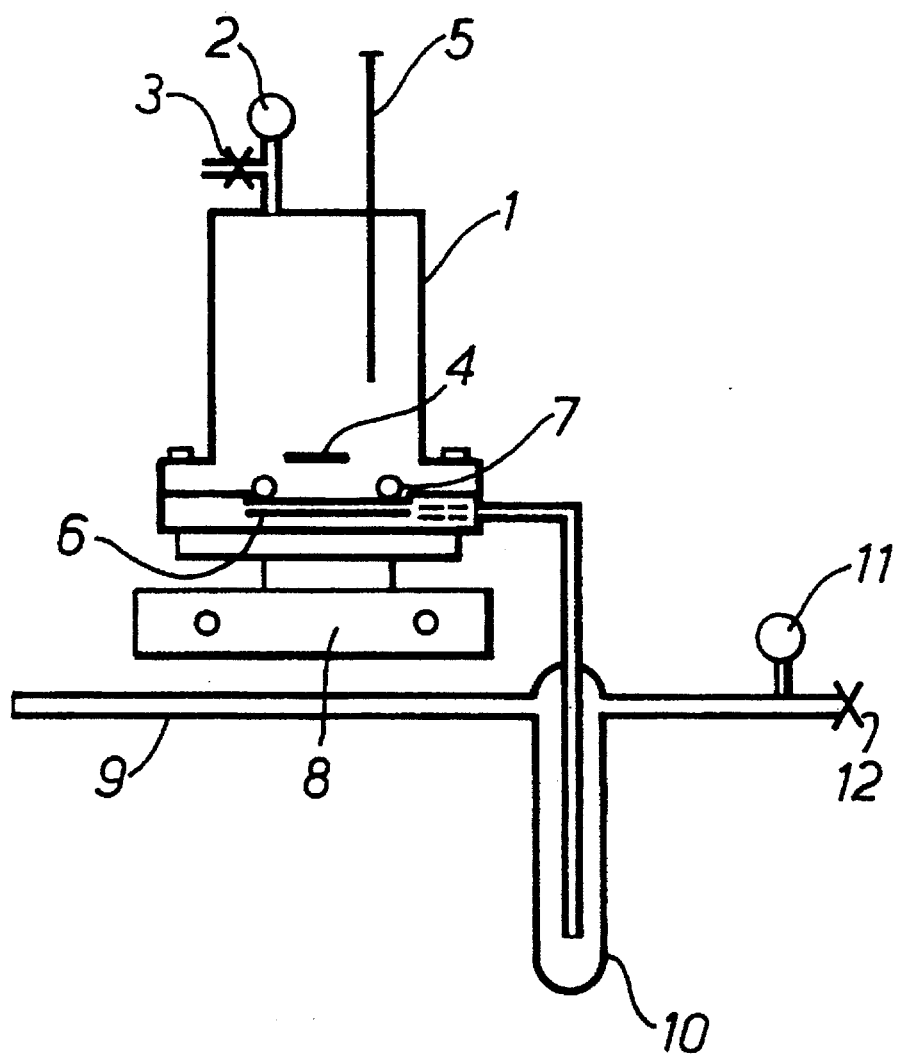
FIG. 22 is a diagram of a pervaporation test apparatus.

The membrane of Example 1 was loaded into a pervaporation test cell in an apparatus as shown in FIG. 22.

The apparatus consisted of a stainless steel test cell 1 fitted with a pressure gauge 2, relief valve 3, magnetic stirrer 4 and thermocouple 5. The membrane prepared as in Example 1 was placed on a porous stainless steel disk 6 and was sealed into the cell with O-ring 7. The cell could be simultaneously heated and stirred by a heater/stirrer 8. Vacuum could be applied through line 9. Vapour removed from the test cell was condensed out in cold trap 10. Line 9 had a pressure gauge 11 and relief valve 12.

The test cell was filled with an isopropanol/water (IPA/H$_2$O) mixture (90/10 wt % respectively). The membrane was initially tested for imperfections by adding 0.1% Dynapol Poly R478 (Trade Mark) red dye, approximate molecular weight 10,000 to the IPA/H$_2$O mixture. No dye was observed in the permeate. The test was then repeated using 0.1% Rhodamine B red dye which has a lower molecular weight, 473. Again, no dye was observed in the permeate. This indicates that no major discontinuities are present in the membrane. Following this initial testing, the temperature was slowly increased to approximately 80° C. The pressure on the side of the membrane remote from the liquid was reduced to 4 mbar (0.4 kN). Permeate was collected over periods of 8 hours and weighted, and small aliquots were analysed. Feed water concentration was monitored throughout. The water flux and permeate water content as a function of feed water concentration are shown together in Table 7, the initial results being measured after 2 days on stream.

The method was then repeated using the same membrane over a range of temperatures. The results are given in Table 8, and show that increased separation performance is obtained at higher temperatures.

After the experiments on IPA/H$_2$O had been concluded, the membrane was used to test ethanol/water separation. Table 9 details the performance of the membrane in dehydrating this aqueous ethanol feed solution.

The procedure was then repeated using the membrane obtained after 2 growths of zeolite in Example 7, the feed being an IPA/H$_2$O mix an 70° C. The results are given in Table 10.

TABLE 7

Dehydration Performance of Zeolite Membrane of Example 1
Isopropanol/Water Mixture 80° C.

| Time On Stream (hours) | Feed Water % wt | Permeate Water % wt | Permeate Water Flux (J) Kg/m²/day |
|---|---|---|---|
| 96.0 | 8.7 | 97.6 | 131.0 |
| 96.5 | 6.7 | 97.1 | 146.0 |
| 97.0 | 4.7 | 95.8 | 120.0 |
| 97.5 | 3.1 | 92.2 | 79.0 |
| 98.0 | 1.7 | 84.2 | 51.0 |
| 98.5 | 0.9 | 72.0 | 24.0 |
| 99.0 | 0.5 | 55.8 | 14.0 |
| 99.5 | 0.27 | 40.8 | 6.5 |
| 100.0 | 0.15 | 23.7 | 3.5 |
| 100.5 | 0.08 | 17.7 | 1.6 |
| 101.0 | 0.07 | 13.1 | 0.71 |
| 101.5 | 0.05 | 9.4 | 0.47 |
| 102.0 | 0.04 | 6.2 | 0.29 |

TABLE 8

Isopropanol/Water Dehydration As A Function Of Temperature

| Temperature °C. | Feed H$_2$O % wt | Water Flux H$_2$O Kg/m²/day |
|---|---|---|
| 70 | 6.0 | 90 |
| 81 | 6.0 | 140 |
| 110 | 6.0 | 230 |

TABLE 9

Dehydration Of Aqueous Ethanol At 80° C.

| Time On Stream (hours) | Feed Water % wt | Permeate Water % wt | Permeate Water Flux (J) Kg/m²/day |
|---|---|---|---|
| 192.0 | 20.8 | 97.9 | 164 |
| 193.1 | 17.7 | 98.1 | 171 |
| 194.1 | 13.0 | 97.8 | 152 |
| 195.1 | 8.7 | 98.1 | 121 |
| 212.1 | 3.4 | 89.9 | 8.7 |
| 213.1 | 0.26 | 34.0 | 0.22 |

TABLE 10

Dehydration Performance of Zeolite Membrane of Example 7
Isopropanol/Water Mixture 70° C.

| Time On Stream (hours) | Feed Water % wt | Permeate Water % wt | Permeate Water Flux (J) Kg/m²/day |
|---|---|---|---|
| 223 | 8.5 | 91.8 | 9.0 |
| 240 | 6.7 | 91.8 | 7.0 |
| 246 | 4.6 | 83.3 | 7.0 |
| 264 | 2.9 | 80.1 | 5.0 |

EXAMPLE 9

100 grams of sodium silicate solution was mixed with 700 grams of distilled water and 100 grams of triethanolamine (TEA). 80 grams of sodium aluminate was dissolved in 700 grams of distilled water and 100 grams of triethanolamine. The silicate solution was added slowly to the aluminate solution with vigorous mixing to form a homogeneous hydrogel. The mixture was loaded into a polypropylene bottle and a piece of the steel filter Bekipor NP 20.01 was immersed into the hydrogel with one side of the filter held securely against the wall of the bottle. The bottle was covered securely and the mixture aged at room temperature for 2 days to allow penetration of the aluminosilicate precursors into the pores of the filter. The bottle was then placed in an oven at 90°–100° C. until the zeolite was crystallised and settled at the bottom of the bottle with a clear solution at the top. The steel filter was removed, washed with distilled water and a sample was characterised by scanning electron microscopy, X-ray powder diffraction and atomic absorption. The remainder of the filtrate was immersed again in a fresh aluminosilicate hydrogel precursor and the treatment was repeated. The filter was again characterised by scanning electron microscopy.

X-ray diffraction showed the zeolite to be a mixture of LTA-type and SOD-type structures. The scanning electron micrographs are shown in FIGS. 23 and 24.

Figure 23:
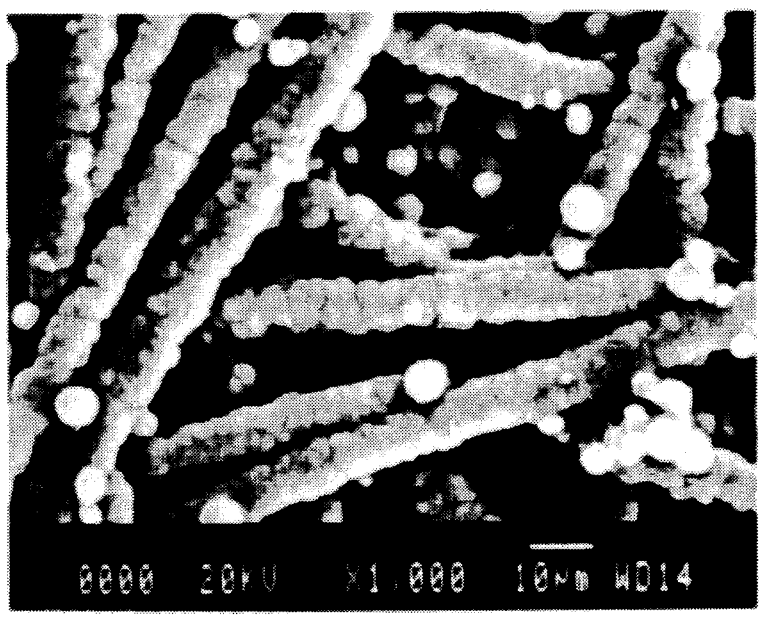
FIG. 23 is an SEM of a Bekipor NP20.01 filter after a single immersion in an alternative hydrogel solution.

FIG. 23 shows the support after a single zeolite crystallisation treatment.

Figure 24:
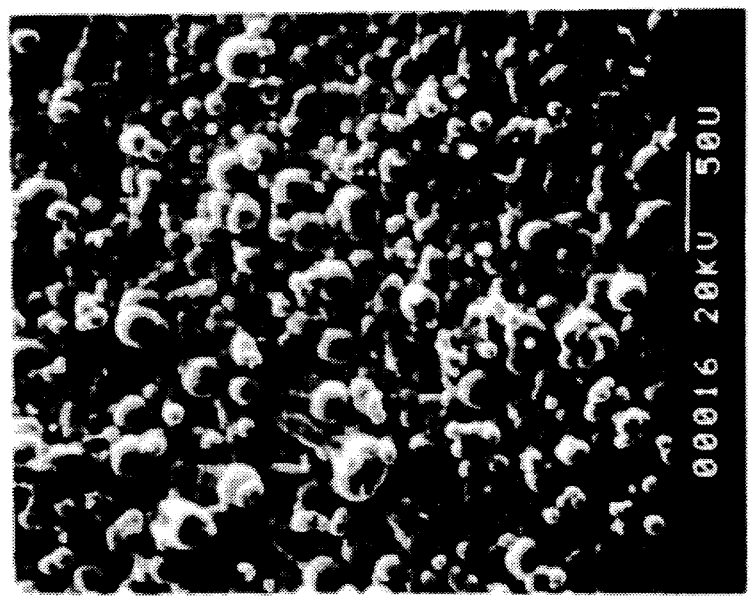
FIG. 24 is an SEM of the filter of FIG. 23 after a second hydrogel solution immersion.

FIG. 24 shows the support after 2 zeolite crystallisation treatments.

From these figures and the supporting analytical data, it can be seen that the zeolite crystals are not merely deposited on the substrate but, as described above, are grown directly on the support surface. The growth continued outwards until it cross-linked and formed a continuous film of zeo-type material across the pores of the substrate, giving the fully formed membrane.

EXAMPLE 10

Hydrogel Preparation 11.2 grams of sodium silicate solution specific gravity 1.57 was mixed with 78.5 grams of distilled water and 11.2 grams of triethanolamine to form solution A. 8.9 grams of sodium aluminate was dissolved in 78.5 grams of distilled water and 11.2 grams of triethanolamine to form solution B. Solution B was added to solution A over 5 minutes with sufficient stirring to maintain homogeneity.

Substrate

Sintered 316 stainless steel filters of 15 micron porosity were used. The filter is commercially available from the NUPRO Company, 4800 East 345th St. Willoughby, Ohio 44094. Cat No. SS-4FE-15.

One filter was immersed in 5% aqueous nitric acid solution (107 grams of solution) for 16 hours and then washed with distilled water.

Zeolite Crystallisation Step

The acid treated filter along with an untreated filter were immersed in the zeolite gel (prepared as described above) contained in a glass vessel. The vessel was sealed and placed in an oven maintained at 95° C. The vessel was inspected periodically until the zeolite was crystallised and settled at the bottom of the vessel. The filters were removed, washed with distilled water, tested as described below, and immersed again in a zeolite gel and another layer of zeolite was crystallised as described above. The zeolite crystallisation treatment was repeated several times.

Test Procedure

The zeolite coated filter was tested in a standard Nupro filter housing. A burette was attached to the inlet and the outlet was either connected to vacuum or left open to atmosphere. A measure of the degree of zeolite coverage was obtained by timing the drop in water level in the burette. The results are shown in FIGS. 25 and 26.

Figure 25:
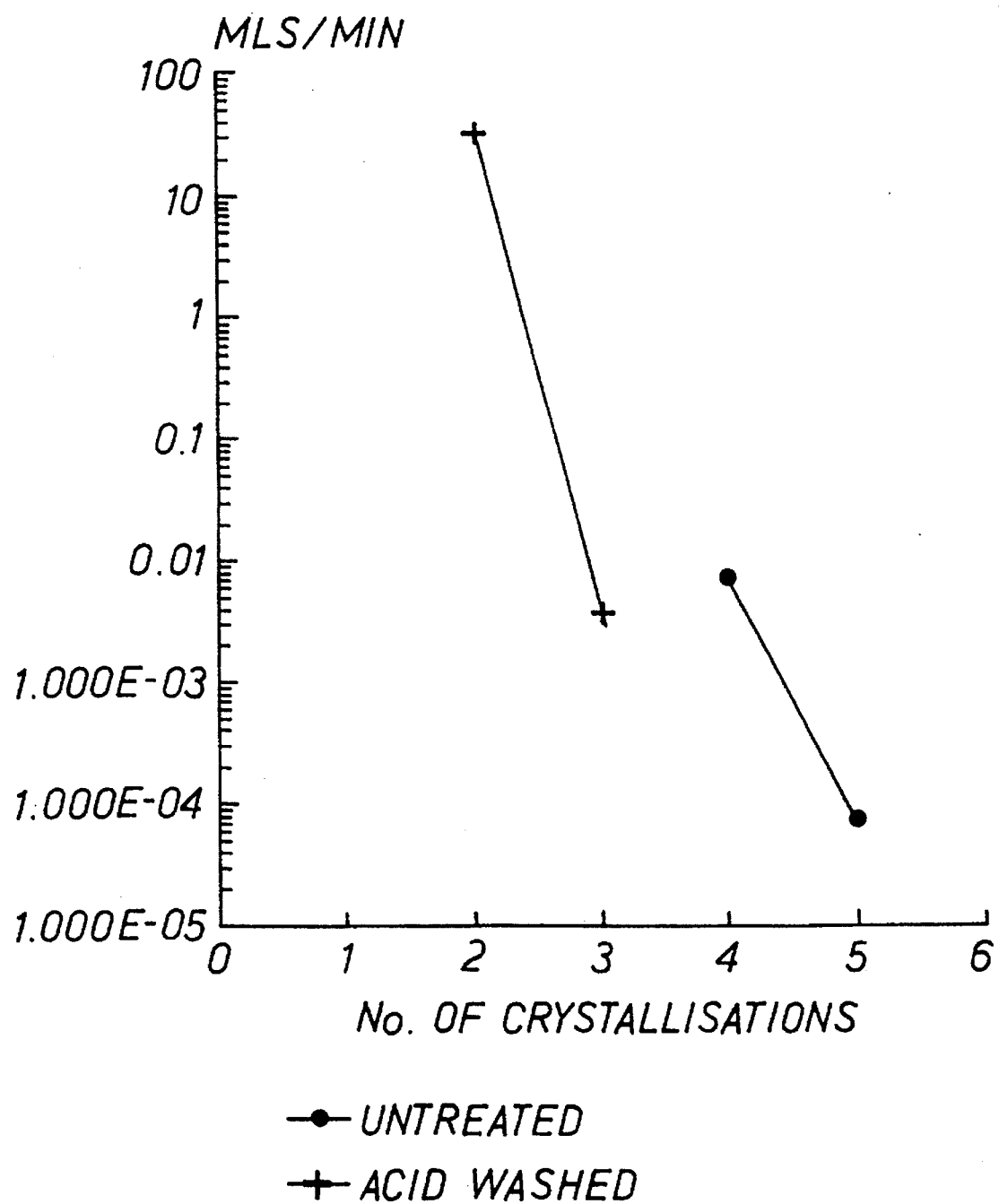
FIG. 25 is a graphical representation of the rate of water drop in a burette versus the number of zeolite crystallization treatments as tested in a Nupro filter housing without vacuum.

FIG. 25 shows the drop in the water level in the burette versus the number of zeolite crystallisation treatment with no vacuum attached to the outlet. It can be seen that the filter which had received the acid treatment required fewer treatments than the untreated filter to match the same rate of water drop.

Figure 26:
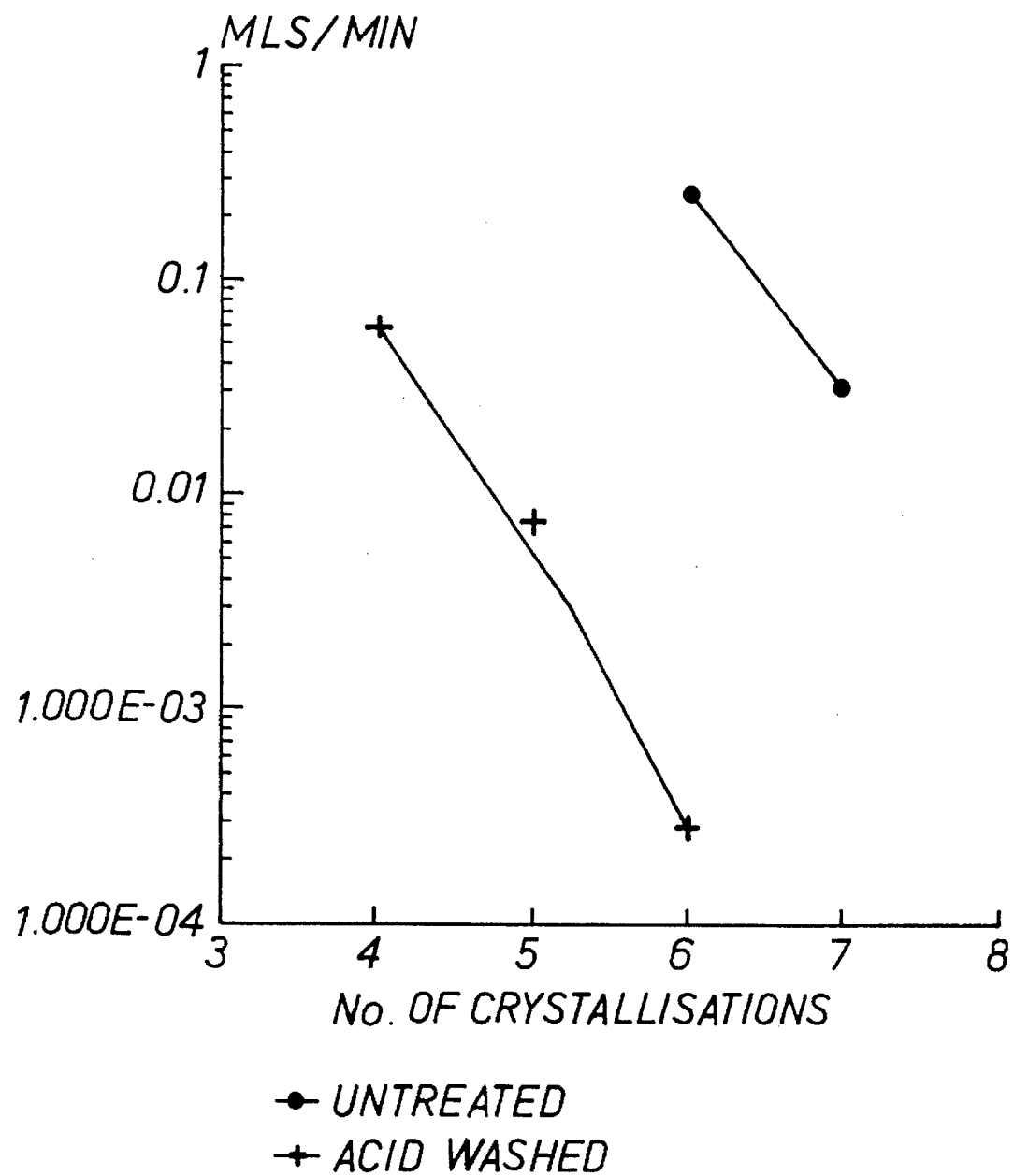
FIG. 26 is a graphical representation of the rate of water drop in a burette versus the number of zeolite crystallization treatments as tested in a Nupro filter housing with vacuum.

FIG. 26 shows the same comparisons as in FIG. 25 but with vacuum (200 mbars reduced pressure) attached to the outlet and with a higher number of zeolite crystallisation treatments. As in FIG. 25 the acid treated filter gave a higher coverage of zeolite and hence reduced porosity.

EXAMPLE 11

A sintered stainless steel filter element, commercially available from the NUPRO Company 4800 East 345th St. Willoughby, Ohio 44094, Cat No. SS-4FE-0.5 having 0.5 micron porosity was used without acid treatment. The zeolite crystallisation treatments were carried out as described in Example 10. After 5 crystallisation treatments the filter was tested for the separation at room temperature of water/isopropanol mixtures (isopropanol contents: 3.8%, 10% and 87.8% by weight).

The bucket-shaped membrane was placed in a brass module with an O-ring seal so that vacuum could be applied to the inner surface and a positive liquid pressure to the outer surface. A circuit comprising a reservoir, liquid pump, pressure gauge and pressure relief valve was arranged so that the outer surface of the membrane was swept by the circulating test liquid at pressure. The liquid flow over the membrane was 15 ml/min. A trap immersed in liquid nitrogen was connected between the module and vacuum pump in order to collect the permeate. Periodically the pre-weighed trap was removed and the contents weighed and analysed by gas chromatography. The results are shown in Table 11.

TABLE 11

| Hours on Stream | Isopropanol Content wt % | | Total Flux | Pressure Applied To The Inlet* |
|---|---|---|---|---|
| | Feed | Permeate | kg/m²/day (1) | Psig |
| 58 | 3.8 | 0.4 | 1.0 | 75 |
| 96 | 3.8 | 0.5 | 1.9 | 75 |
| 103 | 10.0 | 0.5 | 1.1 | 75 |
| 151 | 10.0 | 0.5 | 1.5 | 7.5 |
| 158 | 87.8 | 1.4 | 1.5 | 7.5 |

*Vacuum of less than 0.5 mmHg was applied to the outlet.
(1) Flux was calculated based on the internal geometrical surface area of the filter.

EXAMPLE 12

A porous gamma alumina tube, 10 mm OD, 6.5 mm ID with a porosity of 40 Angstroms obtained from SCT (Societe Ceramique Technique) was used in this experiment.

The sodium aluminate used was obtained from BDH technical grade lot no. 0937960L. The weight composition was taken as $Al_2O_3$ 40.0%; $Na_2O$ 30.0%; $H_2O$ 30.0%.

The sodium silicate used was Fisons SG 1.57 technical grade batch 6943. The weight composition was taken as $SiO_2$ 30.5%; $Na_2O$ 5.3%; $H_2O$ 54.2%.

The sodium silicate (8.60 g) was dissolved in distilled water (25.0 g). The sodium aluminate (5.54 g) was dissolved with stirring in more distilled water (25.0 g). Maintaining the stirring, the sodium silicate solution was added to the sodium aluminate solution using a Pasteur pipette. Stirring of the resultant gel was continued for 30 minutes.

The gel had the following molar composition:

$Al_2O_3$ 0.6715%; $SiO_2$ 1.3511%; $Na_2O$ 1.4831%; $H_2O$ 96.494%

A 65 mm length was cut from the alumina tube and mounted inside a 65 mm length of 10.7 mm ID stainless steel tube. A little PTFE tape was wrapped round the alumina tube to wedge it in position. The two concentric tubes were mounted in a module which enabled one end to be sealed with the other connected to a small reservoir at a higher level. Liquid in the centre tube was thus confined to the centre bore.

The alumina was filled with hydrogel from the reservoir which was then sealed when approximately half full.

The apparatus was then allowed to stand for two hours with the porous tube horizontal then placed in an oven maintained between 90° C. and 95° C. with the porous tube horizontal. After 16 hours the apparatus was removed from the oven, cooled, and flushed with distilled water. The apparatus was dismantled and the bore of the alumina tube lightly brushed to remove debris.

The apparatus was reassembled but with the alumina and surrounding stainless steel tubes rotated through an angle of 120 degrees. The hydrogel preparation and crystallisation procedure were repeated.

The second crystallisation was repeated (the 120 degree rotation being in the same direction).

The alumina tube was removed from the stainless steel outer and mounted in a test module so that a mixture of propan-2-ol and water could be pumped through the centre of the tube in a recycle at ambient temperature whilst vacuum was applied to the outer surface. A liquid nitrogen trap was placed between module and the vacuum pump to collect permeate. Fluxes were approximately 13 kg/m²/day. The equipment was conducted at ambient temperature.

The permeate was analysed on a gas chromatograph fitted with a thermal conductivity detector. The results are given in Table 12.

TABLE 12

| Hours on Stream | % Water in Feed | % Water in Permeate |
|---|---|---|
| 2.74 | 10.6 | 98.3 |
| 3.79 | 10.1 | 98.2 |
| 5.30 | 10.3 | 98.0 |
| 6.64 | 11.1 | 98.0 |
| 7.79 | 10.1 | 98.2 |

EXAMPLE 13

The procedure of Example 12 was used with the following exceptions:

The alumina tube was replaced with a 65 mm length of 11 mm O.D. porous stainless steel tube with wall thickness approx 1.2 mm, and porosity of 5 microns, obtained from Pall. The I.D. of the stainless steel outer tube was bored out to 11 mm to give a press fit with the porous tube. No P.T.F.E. tape was needed.

The crystallisation steps were repeated so that the final membrane had been given 6 evenly distributed treatments.

The results are given in Table 13.

TABLE 13

Dehydration Performance of Membrane of Example 13
Ispropanol/water, 25° C.

| Hours on Stream | % Water in Feed | % Water in Permeate | Water Flux kg/m²/day |
|---|---|---|---|
| 3.5 | 20.7 | 97.3 | 15.9 |
| 10.5 | 12.1 | 94.1 | 10.5 |
| 15.0 | 10.6 | 93.6 | 10.0 |
| 18.0 | 8.8 | 92.9 | 8.5 |
| 22.5 | 5.8 | 75.5 | 6.8 |

EXAMPLE 14

Aluminium fluoride (0.294 g, ex BDH), ammonium fluoride (1.21 g, ex BDH) and tetrapropylammonium bromide (4.37 g, ex Fluka) were dissolved in distilled water (16 g), and Ludox AS-40 (Trade Mark, 5.75 g) was added slowly with stirring to the resultant solution.
The resulting gel had the molar composition:

$0.18\ AlF_3.3H_2O: 2.80\ NH_4F: 1.40\ TPABr: 3.28\ SiO_2: 92.34\ H_2O$

Figure 27:
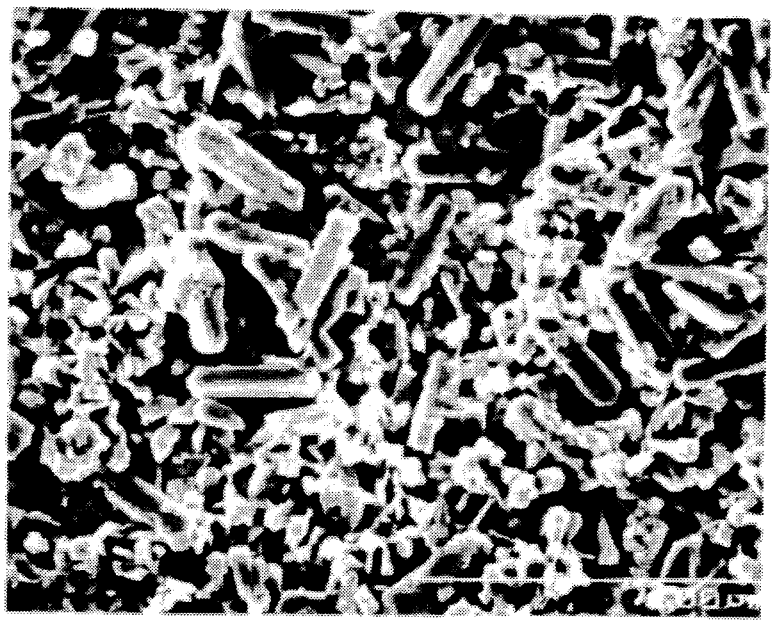
FIG. 27 is an SEM, magnification ×500, of a Bekipor ST5BL3 filter after one zeolite crystallization treatment in a bomb.
Figure 28:
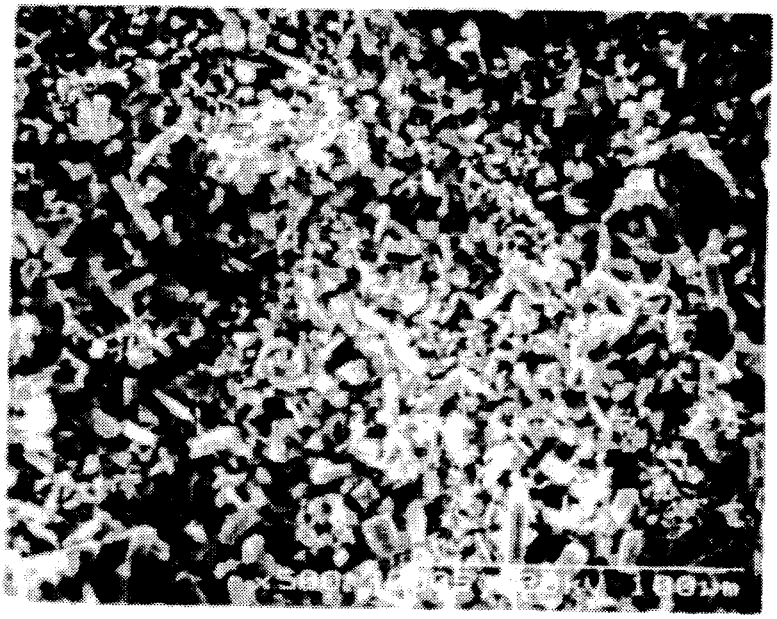
FIG. 28 is an SEM, magnification ×500, of the filter of FIG. 27 after a second zeolite crystallization treatment in a bomb.

A sample of Bekipor ST5BL3 filter was placed at the bottom of a PTFE lined bomb. The bomb was one-third filled with zeolite gel, sealed, and heated with a rocking motion at 205° C. for three days. The bomb was cooled and the contents removed. The Bekipor sample was washed with distilled water. The procedure was then repeated using fresh gel. SEM's, magnification ×500, of the Bekipor surface after the first and second crystallisations, are shown in FIGS. 27 and 28 respectively. Crystals of zeolite ZSM-5 are clearly identifiable.

EXAMPLE 15

Solutions A and B were prepared as follows:

Solution A: 51.6 g sodium aluminate ex Laporte 20/20; analysis gave 26.76% $Na_2O$, 14.54% $Al_2O_3$ and 58.70% $H_2O$; 6.4 g aluminium hydroxide hydrate ex Aldrich, dried gel, analysis gave 68.38% $Al_2O_3$ and 31.62% $H_2O$; and 124.0 g distilled water. The components were mechanically shaken until dissolved.

Solution B: 53.4 g sodium silicate ex BDH, SG 1.57, analysis gave 13.53% $Na_2O$, 29.28% $SiO_2$ and 57.20% $H_2O$; and 155.0 g distilled water.

Solution A was added to Solution B with both stirring and shaking by hand. The gel composition was $2.91Na_2O:Al_2O_3:2.23SiO_2:162.75H_2O$. The procedure of Example 1 was then followed. A total of four growths was carried out.

The resulting membrane was tested by the method of Example 8, except that the temperature was changed. The results are given in Table 14.

TABLE 14

Dehydration Performance of Membrane of Example 15
Isopropanol/Water

| Time on Stream (hrs) | Temp °C. | Feed Water % wt | Permeate Water % wt | Permeate Water Flux (J) Kg/m²/day |
|---|---|---|---|---|
| 48 | 25 | 10.0 | 90.2 | 6.0 |

TABLE 14-continued

Dehydration Performance of Membrane of Example 15
Isopropanol/Water

| Time on Stream (hrs) | Temp °C. | Feed Water % wt | Permeate Water % wt | Permeate Water Flux (J) Kg/m²/day |
|---|---|---|---|---|
| 72 | 60 | 12.0 | 83.1 | 43.0 |

EXAMPLE 16

The procedure of Example 15 was repeated except that the compositions of Solutions A and B were as follows:

Solution A: 34.4 g sodium aluminate ex BDH, analysis gave 37.86% $Na_2O$, 61.30% $Al_2O_3$ and 0.83% $H_2O$; 30.0 g triethanolamine (98%) ex Aldrich; and 155.0 g distilled water.

Solution B: 53.4 g sodium silicate ex BDH, SG 1.57, analysis gave 13.53% $Na_2O$, 29.28% $SiO_2$ and 57.20% $H_2O$; and 155.0 g distilled deionised water.

The hydrogel composition was $1.58Na_2O:0.97TEA:Al_2O_3:1.26SiO_2:91.43H_2O$.

The results are given in Table 15.

TABLE 15

Dehydration Performance of Membrane of Example 16
Isopropanol/Water

| Time on Stream (hrs) | Temp °C. | Feed Water % wt | Permeate Water % wt | Permeate Water Flux (J) Kg/m²/day |
|---|---|---|---|---|
| 48 | 25 | 10.3 | 91.2 | 17.6 |
| 72 | 60 | 10.4 | 66.6 | 117.0 |

COMPARATIVE EXAMPLES

A series of experiments were carried out in which the instructions of various prior art documents were repeated. In all cases, best efforts were used to try to produce a membrane according to the present invention by using the teachings of the prior art. In no case was such a membrane produced. Details are given below.

COMPARATIVE EXAMPLE A

EP-A-135069

This document teaches that zeolite membranes can be prepared by passing a zeolite gel through a filter onto a support, following which the support is placed in an oven to produce a zeolite membrane. Attempts to reproduce this teaching were as follows.

Hydrogel was prepared as described in Example 1 of EP-A-135069. Because the example does not specify the quantities of each component in the gel, four separate recipes were used as given in Table 16.

TABLE 16

EP-A-135069 Comparison
Hydrogel Compositions and Component Molar Ratios

| Composition No. | Ludox AS40 g | NaAlO$_2$ g | NaOH g | Water g | Na$_2$Si$_4$O$_9$ g | Na$_2$O/ SiO$_2$ | SiO$_2$/ Al$_2$O$_3$ | H$_2$O/ Na$_2$O |
|---|---|---|---|---|---|---|---|---|
| #1 | 20.00 | 9.76 | 2.04 | 279.90 |  | 0.5 | 4 | 246 |
| #2 | 20.00 | 5.57 | 2.66 | 283.86 |  | 0.5 | 4 | 246 |
| #3 |  | 34.40 |  | 310.00 | 53.4 | 1.0 | 2.59 | 71 |
| #4 |  | 5.67 | 0.58 | 80.30 | 13.4 | 1.1 | 2.01 | 65 |

The sodium aluminate was dissolved in distilled water and the silica sol added. The mixture was stirred at room temperature for 30 minutes and then aqueous sodium hydroxide added.

90 mm diameter filters were prepared and clamped in a PTFE holder leaving an area of 70 mm diameter through which material could be filtered. The holder provided a 350 cm$^3$ reservoir above the filter.

The hydrogel was prepared and the filter placed in the holder. A Bekipor support was immersed in sufficient sodium hydroxide solution having the same pH as the hydrogel to touch the filter in the holder when placed over it. The filter was wetted with one or two drops of methanol and the hydrogel gently poured onto the filter and left for a specified time. After removing the substrate it was sealed in a QVF tube and heated in an oven for 5 hours at 110° C. The substrate was then removed from the tube, washed in hot distilled water and air dried. The membrane was examined by XRD to determine the presence of any zeolite. Details of the 7 experiments carried out are as follows:

Experiment 1

A hydrogel of composition #1 was prepared. Using the above procedure with a 0.2 micron filter, the experiment failed to produce any zeolite on the substrate.

The pH of the various solutions were checked. A solution of 20 g of Ludox AS40 in 250 g of water had a pH 9.64. Addition of 9.78 g of sodium aluminate raised the pH to 13.29 and the final addition of 2.07 g of sodium hydroxide in 30 g of water produced a hydrogel with pH 13.78. The pH meter was calibrated against standard buffer solutions and found to be accurate.

Experiment 2

An alternative batch of sodium aluminate was used to prepare the hydrogel of composition #2. The pH was again measured and found to be 13.85; despite this the procedure to produce the zeolite was carried out, and again, XRD showed no evidence of any zeolite.

Experiment 3

Hydrogel of composition #2 was again used, but on this occasion the system was left overnight (approximately 17 hours) before removing the substrate for hydrothermal treatment. There was no evidence of zeolite on the substrate when examined by XRD.

Experiment 4

The procedure of Experiment 3 was repeated using a 1.0 micron PTFE filter, but no zeolite was produced on the substrate.

Experiment 5

The filter was changed again to a 2.0 micron polycarbonate filter, but using the hydrogel of composition #2 for 2 hours failed to produce any zeolite on the substrate. A dried sample of this hydrogel had no zeolite crystals present.

Experiment 6

Hydrogel of composition #3 and pH 13.5, which has previously been used to produce zeolite A, was used with a 2.0 micron polycarbonate filter. The substrate was under the filter for 1 hour and subjected to a hydrothermal treatment for 5 hours at 110° C. There was no evidence of zeolite A on the substrate, but zeolite crystals were present in a sample of dried hydrogel.

Experiment 7

Hydrogel of composition #4, which is known to produce zeolite A, was used with a 2.0 micron polycarbonate filter, but without the support being immersed in sodium hydroxide solution. Thus an attempt was made to grow the zeolite from the dissolved species which filtered through to the support. No zeolite was detected on the support.

In summary, it was not possible to produce a zeolite film on a stainless steel substrate using the data supplied in EP-A-135069. Hydrogels of two different compositions suggested by EP-A-135069 failed to produce any zeolite crystals. Using a hydrogel of proven zeolite forming composition did result in zeolite crystals in the hydrogel, but no zeolite on the support. Despite using a filter with a pore size 10 times greater than recommended, no zeolite was detected on the support in any experiment.

COMPARATIVE EXAMPLE B

CA 1 235 684

Claim 1 of this document reads: "A filter for substance separation comprising a substrate made of a porous glass and a zeolite-based film formed directly on the porous glass, the zeolite-based film having a thickness of 1 μm to 500 μm." Although this claim states that the zeolite film is formed directly on the porous glass, the actual filters prepared in the Examples of the document all contain an intermediate layer of amorphous material between the substrate and the zeolite—see Tables 2 and 3 on pages 14 and 15. Experiments were carried out as follows to determine whether a membrane without a layer of amorphous material could be made following the teachings of the document.

Example 1 of CA 1 235 684 was a borosilicate glass of defined chemical composition. Analyses of the commercially-available glasses sold under the Trade Marks "Pyrex" and "Vycor" showed that Vycor (ex Corning, N.Y.) corresponded most closely to that used in CA 1 235 684.

Three types of Vycor are used in these experiments: porous sheet (Type 7930), non-porous sheet (Type 7913) and porous tube (Type 7930). Pyrex was also used for completeness. Assuming that the test pieces used in CA 1 235 684 were Vycor, the disc diameters can be calculated as 50 or 61 mm depending on whether the discs were porous or not. For these experiments, a test piece of diameter 25 mm was chosen as being more suitable for the available equipment. The weights of gel components chosen were scaled accordingly.

A total of 14 experiments were carried out. Details of the substrates and the gel compositions used are given in Table 17.

TABLE 17

Details of Comparative Example B

| Experiment | Glass Used | Gel Composition* (Millimoles) | | | | | |
|---|---|---|---|---|---|---|---|
| | | NaOH | NaCl | TPABr | SiO$_2$ | Al$_2$O$_3$ | B$_2$O$_3$ |
| 1 | Pyrex | 6.00 | | 7.51 | 45.6 | 0.734 | 6.15 |
| 2 | discs | 6.00 | | | 45.6 | 0.734 | 6.15 |
| 3 | | 6.00 | | 17.65 | 45.6 | 0.734 | 6.15 |
| 4 | | 3.75 | | 1.728 | 45.6 | 0.734 | 6.15 |
| 5 | | 5.5 | 38.8 | 1.765 | 45.6 | 0.734 | 6.15 |
| 6 | V 7930 | 3.75 | | 1.728 | 17.4 | 0.0428 | 0.47 |
| 7 | tube | 5.5 | 38.8 | 1.765 | 17.4 | 0.0428 | 0.47 |
| 8 | | 5.5 | 38.8 | | 17.4 | 0.0428 | 0.47 |
| 9 | V 7913 | 3.75 | | 1.728 | 57.5 | 0.141 | 1.38 |
| 10 | discs | 5.5 | 38.8 | 1.765 | 57.5 | 0.141 | 1.38 |
| 11 | V 7930 | 3.75 | | 1.728 | 22.1 | 0.0541 | 0.529 |
| 12 | discs | 5.5 | 38.8 | 1.765 | 22.1 | 0.0541 | 0.529 |
| 13 | V 7930 | 3.75 | | 1.728 | 44.1 | 0.108 | 1.06 |
| 14 | discs | 5.5 | 38.8 | 1.765 | 44.1 | 0.108 | 1.06 |

*All formulations contained 32.7 g of distilled water
All discs 3.2 mm thick except Experiments 13 and 14, 1.6 mm A 50 ml PTFE lined stainless steel bomb was mounted in a cradle inside an oven so that it could be rocked by a rod extended through the ventilation hole. The glass disc was placed inside the bomb along with the gel. The bomb was closed, and heated at between 193° and 195° C. for 65 hours (except Experiment 1, 71 hours and Experiment 14 which failed somewhere between 48 and 65 hours).

In all experiments, a layer of amorphous material was clearly visible on the surface of the glass substrate.

X-ray diffraction analysis showed that the top layer of the finished product contained the materials detailed in Table 18.

TABLE 18

X-ray Diffraction Results of Comparative Example B

| Experiment | Surface Composition |
|---|---|
| 1 | Amorphous & tetrapropylammonium bromide |
| 2 | Amorphous |
| 3 | Amorphous |
| 4 | Amorphous |
| 5 | MFI (ZSM-5) |
| 6 | MFI & SiO$_2$ |
| 7 | MFI & SiO$_2$ |
| 8 | Amorphous & kenyaite & quartz |
| 9 | Amorphous |
| 10 | MFI |
| 11 | MFI & amorphous |
| 12 | MFI & amorphous |
| 13 | MFI & amorphous |
| 14 | MFI & amorphous |

Figure 29:
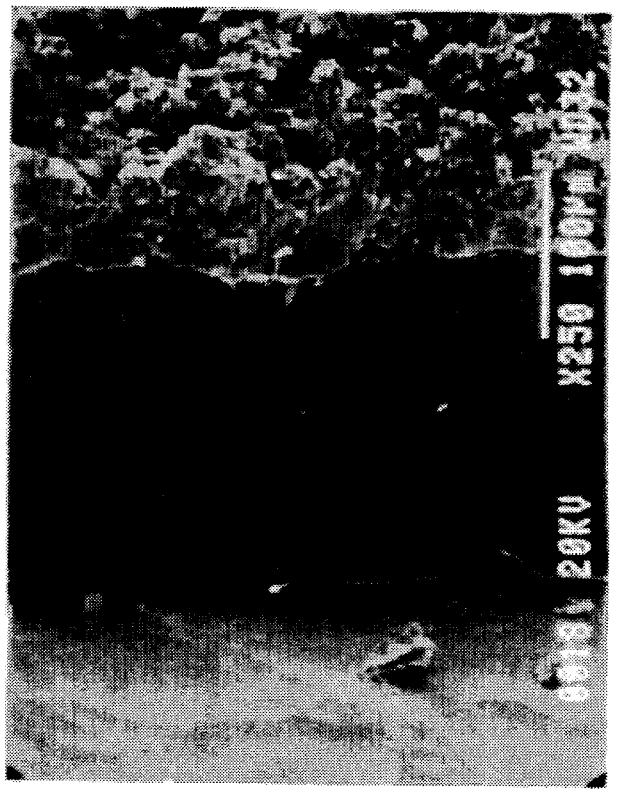
FIG. 29 is an SEM, magnification ×250, of a comparative zeolite film.

A scanning electron micrograph magnification ×250 of the finished product of Experiment 5 is shown as FIG. 29. The lower portion of the figure is the surface of the glass support, the middle portion is the layer of amorphous material, and the upper layer is a layer of MFI-type zeolite.

COMPARATIVE EXAMPLE C

JP 63291809

This document claims a method of manufacturing synthetic zeolite in membrane form in which an aqueous mixture containing at least a silica source and an alkali metal source of alkaline earth metal source are subjected to hydrothermal reaction in the presence of a porous alumina carrier. We have repeated the examples of this document, but have failed to produce a continuous membrane according to the present invention.

The Examples of JP 63291809 do not specify the type of alumina used, but the specification states that gamma, theta, chi, kappa, delta or alpha alumina or bochmite can be used. In initial experiments, all of Examples 1 to 5 of JP 63291809 were repeated exactly using fragments of porous alpha alumina filter tubes as substrate. In all the experiments, no zeolite crystals were observed on any of the substrates.

An experiment was then carried out to reproduce Example 1 extending the time for hydrothermal reaction from 2 to 16 hours. No zeolite crystals were observed on the alpha alumina.

The alumina was then changed. 20 mm diameter 0.5 g discs of Boehmite were prepared, and used in repeats of Example 1 with treatment times of 2 and 16 hours. Both discs were completely converted to a white powder. To reduce the reactivity of the discs, further discs were heat-treated at 400° C. for 2 hours. They were then tested in a repeat of Example 1 for 2 hours. A thin fragile disc with a white coating which broke up on drying was obtained. 3 further experiments using lower sodium hydroxide concentrations in the gel were carried out. At the lowest hydroxide concentration, a layer of Gibbsite (alumina hydroxide) was formed. The other two experiments gave amorphous layers.

The alumina was changed again. A fragment of porous gamma alumina tube was used in repeats of Examples 1, 4 and 5. No success was obtained. Example 4 was then repeated using a longer reaction time for 19 hours. SEM analysis showed that crystals of zeolite had indeed been formed on the surface of the alumina. However, the coverage was not complete, large gaps being present between the crystals.

We claim:

1. A membrane which comprises a film of a crystalline material which is a molecular sieve with a crystal structure made up of a tetrahedra joined together through oxygen atoms to produce an extended network with channels of molecular dimensions, said film being carried by a porous support in which the crystalline material of the film is essentially continuous over the pores of the support, extends into the support and the crystalline material is crystallized directly from and bonds directly to the Support wherein any pin-holes initially present in the film of crystalline material have been blocked by a post-treatment.

2. A membrane as claimed in claim 1, in which the support is a porous metal.

3. A membrane as claimed in claim 1, in which the support has an average pore diameter of from 0.1 to 2000 microns.

4. A membrane as claimed in claim 1, in which the pore diameter of the support is larger than the average crystal size of the crystalline material.

5. A membrane as claimed in claim 1 in which the film of crystalline material is essentially continuous over the whole surface of the support.

6. A membrane as claimed in claim 5 in which the film of crystalline material is present in a layer from 1 to 70 microns thick.

7. A membrane which comprises a film of a crystalline material which is a molecular sieve with a crystal structure made up of tetrahedra joined together through oxygen atoms to produce an extended network with channels of molecular dimensions, said film being carried by a porous metal of a porous polymer support in which the crystalline material of the film is essentially continuous over the pores of the support, extends into the support and the crystalline material is crystallized directly from and bonds directly to the support.

8. A membrane as claimed in claim 7, in which the support has an average pore diameter of from 0.1 to 2000 microns.

9. A membrane as claimed in claim 7, in which the pore diameter of the support is larger than the average crystal size of the crystalline material.

10. The membrane of claim 9 in which the average pore diameter of the support is 5 to 200 microns.

11. A membrane as claimed in claim 7 in which the film of crystalline material is essentially continuous over the whole surface of the support.

12. A membrane as claimed in claim 11 in which the film of crystalline material is present in a layer from 1 to 70 microns thick.

13. A membrane which comprises a film of a crystalline material which is a molecular sieve with a crystal structure made up of tetrahedra joined together through oxygen atoms to produce an extended network with channels of molecular dimensions, said film being carried by a porous support which has an average pore diameter of from 0.5 to 2000 microns in which the crystalline material of the film is essentially continuous over the pores of the support, extends into the support and the crystalline material is crystallized directly from and bonds directly to the support.

14. A membrane as claimed in claim 13, in which the pore diameter of the support is larger than the average crystal size of the crystalline material.

15. A membrane as claimed in claim 13 in which the film of crystalline material is essentially continuous over the whole surface of the support.

16. A membrane as claimed in claim 15 in which the film of crystalline material is present in a layer from 1 to 70 microns thick.

17. A membrane which comprises a film of a crystalline material which is a molecular sieve with a crystal structure made up of tetrahedra joined together through oxygen atoms to produce an extended network with channels of molecular dimensions, said film being carried by a porous support in which the crystalline material of the film is essentially continuous over the pores of the support, extends into the support and the crystalline material is crystallized directly from and bonds directly to the support, the pore diameter of which is larger than the average crystal size of the crystalline material.

18. A membrane as claimed in claim 17 in which the film of crystalline material is essentially continuous over the whole surface of the support.

19. A membrane as claimed in claim 18 in which the film of crystalline material is present in a layer from 1 to 70 microns thick.

* * * * *